US012709718B2

(12) United States Patent
Piorkowski

(10) Patent No.: US 12,709,718 B2
(45) Date of Patent: Aug. 18, 2026

(54) LAUNDRY FORMULAS WITH HIGH SOLVENT RATIO FOR IMPROVED MILDNESS

(71) Applicant: Henkel AG & Co. KGaA, Duesseldorf (DE)

(72) Inventor: Daniel Thomas Piorkowski, Fairfield, CT (US)

(73) Assignee: Henkel AG & Co. KGaA, Dusseldorf (DE)

( * ) Notice: Subject to any disclaimer, the term of this patent is extended or adjusted under 35 U.S.C. 154(b) by 373 days.

(21) Appl. No.: 18/498,224

(22) Filed: Oct. 31, 2023

(65) Prior Publication Data

US 2025/0136896 A1 May 1, 2025

(51) Int. Cl.

| | |
|---|---|
| ***C11D 3/00*** | (2006.01) |
| ***C11D 1/74*** | (2006.01) |
| ***C11D 3/37*** | (2006.01) |
| ***C11D 3/43*** | (2006.01) |

(52) U.S. Cl.

CPC .............. *C11D 3/3723* (2013.01); *C11D 1/74* (2013.01); *C11D 3/0047* (2013.01); *C11D 3/3707* (2013.01); *C11D 3/43* (2013.01); *C11D 2111/12* (2024.01)

(58) Field of Classification Search

CPC ....... C11D 3/3723; C11D 1/74; C11D 3/0047; C11D 3/3707; C11D 3/43; C11D 2111/12; C11D 1/72; C11D 3/2041; C11D 3/2044; C11D 3/2065; C11D 3/2068

USPC .................................................. 510/439, 442

See application file for complete search history.

(56) References Cited

U.S. PATENT DOCUMENTS

| | | | | |
|---|---|---|---|---|
| 6,551,982 B1 | | 4/2003 | Ricci et al. | |
| 8,551,929 B2 | | 10/2013 | Graham et al. | |
| 10,696,926 B2 | * | 6/2020 | Camire | C11D 3/046 |
| 10,774,294 B2 | | 9/2020 | Piorkowski | |
| 11,492,574 B2 | | 11/2022 | Sun et al. | |
| 2015/0071572 A1 | * | 3/2015 | Dreher | B65D 29/00 383/105 |
| 2018/0016523 A1 | | 1/2018 | Coope Epstein et al. | |
| 2020/0390662 A1 | * | 12/2020 | Sagel | A61K 8/736 |
| 2021/0189302 A1 | * | 6/2021 | Piorkowski | C11D 17/043 |
| 2022/0356418 A1 | * | 11/2022 | Knight | C11D 3/3753 |

FOREIGN PATENT DOCUMENTS

WO WO 2015185689 A1 * 12/2015 ......... C11D 3/38636

OTHER PUBLICATIONS

Gotte, V.E., "Synthetische Tenside in Medizinisch-kosmetischen Badern," Aesthetische Medizin 15:313-319, Berlin: Berliner Med. Verl. Anst., Germany (Oct. 1966).

* cited by examiner

*Primary Examiner* — Eisa B Elhilo

(74) *Attorney, Agent, or Firm* — Sterne, Kessler, Goldstein & Fox P.L.L.C.

(57) ABSTRACT

The present disclosure provides a unit dose product comprising a pouch formed from a water-soluble film material and a detergent composition disposed within the pouch. The detergent composition comprises about 5 to about 25 wt % water, about 20 to about 40 wt % of at least one surfactant, about 35 to about 55 wt % non-aqueous solvent comprising polyethylene glycol and glycerin, and no enzyme, wherein a percent swelling is not more than about 30% in a 24 hr test. The composition can further comprise additional components, such as a base, a performance polymer, an anti-redeposition agent, a defoamer, a bleaching agent, a bleach activator, a chelating agent, an optical brightener, a bitterant, a corrosion inhibitor, or any combination thereof. The detergent composition comprises surfactants with improved mildness and solvents with lower allergic components.

21 Claims, No Drawings

LAUNDRY FORMULAS WITH HIGH SOLVENT RATIO FOR IMPROVED MILDNESS

BACKGROUND

Laundry detergent compositions contain surfactants which impart good cleaning performance. However, many surfactant compositions can cause skin and eye irritation. Preferred surfactants for efficacy have included the anionic linear alkylbenzene sulfonates (LAS) that can be a harsh additive to detergent compositions, and replacements such as alcohol ethoxysulfonates can contain traces of regulated compounds. Further, solvents included in detergent compositions can be allergens. Propylene glycol was named the 2018 allergen of the year by the American Contact Dermatitis Society.

Packaging detergent compositions in unit dose products is a preferred consumer product for use in laundry applications. Such unit dose products have several advantages, including convenience of use and dispensing, lower cost per use, and minimized skin contact with potentially irritating cleaning compositions. However, formulating detergent compositions to be packaged in unit dose film pouches presents additional challenges.

There is a need for a unit dose product comprising a detergent composition that can effectively clean textiles while retaining mildness and limiting allergenic compounds.

BRIEF SUMMARY

The present disclosure relates to a unit dose product comprising a pouch formed from a water-soluble film material and a detergent composition comprising about 5 to about 25 wt % water, about 20 to about 40 wt % of at least one surfactant, and about 35 to about 55 wt % non-aqueous solvent comprising polyethylene glycol and glycerin, wherein no enzyme is present in the composition, wherein a percent swelling is not more than about 30% in a 24 hour (hr) test, and wherein the detergent composition is disposed within the pouch. In some aspects, a height of the pouch does not decrease by more than about 15% over a temperature range of 0° F. to 125° F.

In some aspects, the detergent composition has a Zein score of not more than 1.5% dissolved zein when tested on a 3% dilution. In some aspects, the detergent composition has a Zein score of not more than 1% when tested on a 3% dilution. In some aspects, the detergent composition has a Zein score of not more than 0.5% when tested on a 3% dilution.

In some aspects, the detergent composition comprises about 40 to about 50 wt % of non-aqueous solvent.

In some aspects, the non-aqueous solvent further comprises ethanol, n-propanol, isopropanol, ethylene glycol, diethylene glycol, triethylene glycol, diethylene glycol monobutyl ether, propylene glycol, dipropylene glycol, tripropylene glycol, dipropylene glycol monobutyl ether, 1,3-butylene glycol, 1,4-butylene glycol, 1-(1-butoxy-2-propoxy)-2-propanol, 2-methyl-2,4-pentanediol, 1,5-pentanediol, 1,6-hexanediol, or a combination thereof. In some aspects, the non-aqueous solvent further comprises propylene glycol, ethanol, or a combination of both.

In some aspects, the non-aqueous solvent comprises polyethylene glycol and glycerin in a weight ratio of about 1:1 to about 2:1.

In some aspects, the at least one surfactant is an anionic surfactant, a cationic surfactant, a zwitterionic surfactant, a nonionic surfactant, or a combination thereof. In some aspects, the at least one (e.g., 1, 2, 3, 4, 5, or 6, etc.) surfactant is an anionic surfactant, a cationic surfactant, a zwitterionic surfactant, a nonionic surfactant, or a combination thereof. For example, the detergent composition can comprise a combination of an anionic, a nonionic surfactant, or a combination of one or more thereof.

In some aspects, the detergent composition comprises about 25 to about 35 wt % of at least one surfactant.

In some aspects, the surfactant to solvent weight ratio ranges from about 1:1 to about 1:1.5.

In some aspects, the at least one surfactant comprises a non-ionic alcohol ethoxylate (AE), an alkyl ether sulfate (AES), or a combination of both. In some aspects, the non-ionic alcohol ethoxylate (AE) comprises the formula $R^1$-$(EO)_n$—OH, wherein $R^1$ is a $C_{12}$-$C_{18}$ alkyl group, EO is ethoxylate, and n is an integer of moles from 1 to 15. In some aspects, the at least one surfactant comprises AE and AES with an AE to AES weight ratio of at least about 3:1. In some aspects, the AE to AES weight ratio is between about 4:1 and about 6:1.

In some aspects, the at least one surfactant does not include a linear alkyl benzene sulfonate.

In some aspects, the detergent composition has a pH of about 6.5 to about 12. In some aspects, the detergent composition has a pH of about 7 to about 8.

In some aspects, the detergent composition further comprises at least one additive selected from a base, a performance polymer, an anti-redeposition agent, a defoamer, a bleaching agent, a bleach activator, a chelating agent, an optical brightener, a bitterant, a corrosion inhibitor, and any combination thereof. In some aspects, the performance polymer comprises at least one of polyethyleneimine ethoxylate and polyethyleneimine ethoxylate propoxylate.

In some aspects, the detergent composition comprises about 45 to about 55 wt % of non-aqueous solvent comprising polyethylene glycol and glycerin, a total of about 25 to about 35 wt % surfactants comprising at least one surfactant selected from an alcohol ethoxylate, an alkyl ether sulfate, coco fatty acid, and any combination thereof, and at least one additive selected from a base, a defoamer, a chelating agent, an optical brightener, a bitterant, a corrosion inhibitor, and a combination thereof.

In some aspects, the water-soluble film material comprises polyvinyl alcohol (PVOH) or polyvinyl acetate (PVA).

DETAILED DESCRIPTION

Provided herein is a unit dose product comprising a pouch formed from a water-soluble film material and a detergent composition comprising about 5 to about 25 wt % water, about 20 to about 40 wt % of at least one surfactant, and about 35-55% non-aqueous solvent comprising polyethylene glycol and glycerin, wherein no enzyme is present in the composition, wherein a percent swelling is not more than about 30% in a 24 hr test, and wherein the detergent composition is disposed within the pouch.

Non-limiting examples of the various aspects are shown in the present disclosure.

Definitions

In order that the present disclosure can be more readily understood, certain terms are first defined. Additional definitions are set forth throughout the detailed disclosure.

All of the various aspects, embodiments, and options disclosed herein can be combined in any and all variants unless otherwise specified. Terms in this application control in the event of a conflict with a patent or publication term that is incorporated by reference.

As used herein, "a," "an," or "the" means one or more unless otherwise specified.

Furthermore, "and/or," where used herein, is to be taken as specific disclosure of each of the two specified features or components with or without the other. Thus, the term "and/or" as used in a phrase such as "A and/or B" herein is intended to include "A and B," "A or B." "A" (alone), and "B" (alone). Likewise, the term "and/or" as used in a phrase such as "A, B, and/or C" is intended to encompass each of the following aspects: A, B, and C; A, B, or C; A or C; A or B; B or C; A and C; A and B; B and C; A (alone); B (alone); and C (alone).

Open terms such as "include." "including." "contain." "containing" and the like mean "comprising." The term "or" can be conjunctive or disjunctive.

It is understood that wherever aspects are described herein with the language "comprising," otherwise analogous aspects described in terms of "consisting of" and/or "consisting essentially of" are also provided.

Some inventive embodiments contemplate numerical ranges. Every numerical range provided herein includes the range endpoints as individual inventive embodiments. When a numerical range is provided, all individual values and sub-ranges therein are present as if explicitly written out.

The term "about" includes the recited number±10%. For example, "about 10" means 9 to 11.

The phrase "substantially free of" means that a composition contains little to no specified ingredient/component, such as less than about 5 wt %, less than about 4 wt %, less than about 3 wt %, less than about 2 wt %, less than about 1 wt %, less than about 0.5 wt %, less than about 0.3 wt %, less than about 0.2 wt %, less than about 0.1 wt %, or about 0 wt % of the specified ingredient. For instance, in some aspects, the detergent composition can be substantially free of, containing little to no of a linear alkyl benzene sulfonate.

As used herein, the "%" described in the present application refers to the weight percentage unless otherwise indicated.

The term "at least" prior to a number or series of numbers is understood to include the number adjacent to the term "at least," and all subsequent numbers or integers that could logically be included, as clear from context. For example, "at least one surfactant" means that 1, 2, 3, or more surfactants are included in the composition. When at least is present before a series of numbers or a range, it is understood that "at least" can modify each of the numbers in the series or range. "At least" is also not limited to integers (e.g., "at least 5%" includes 5.0%, 5.1%, 5.18% without consideration of the number of significant figures).

Unless states otherwise, the term "by weight of the composition" refers to a composition of a final product derived from a process, unless otherwise defined.

The terms "process" and "method" can be used interchangeably.

"Alkoxylate" or "alkoxylated" as used in the present application means: the presence of a polyaliphatic ether moiety in a compound, such as ethoxylate ($—CH_2CH_2O—$) or propoxylate ($—CH(CH_3)CH_2O—$). A polyethoxylate is multiple repeat units of ethoxylate ($(—CH_2CH_2O—)_n$), and a polypropoxylate is multiple repeat units of propoxylate ($(—CH(CH_3)CH_2O—)_m$). The subscripts "n" and "m" are the same or different and each is an integer of 1 to 100 (e.g., 1 to 90, 1 to 80, 1 to 70, 1 to 60, 1 to 50, 1 to 40, 1 to 30, 1 to 20, 1 to 15, 1 to 14, 1 to 13, to 13, 1 to 12, 1 to 11, 1 to 10, 1 to 9, 1 to 8, 1 to 7, 1 to 6, 1 to 5, or 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, or 100).

The terms "ethoxylate" or "ethoxylated" as used in the present application means the presence of multiple repeat units of ethoxylate ($(—CH_2CH_2O—)_n$). The subscript "n" is an integer of 1 to 100 (e.g., 1 to 90, 1 to 80, 1 to 70, 1 to 60, 1 to 50, 1 to 40, 1 to 30, 1 to 20, 1 to 15, 1 to 14, 1 to 13, to 13, 1 to 12, 1 to 11, 1 to 10, 1 to 9, 1 to 8, 1 to 7, 1 to 6, 1 to 5, or 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, or 100).

The term "pack height" as used in the present application refers to the height of a pouch formed from a water-soluble film material when laid on a flat surface and filled with a detergent composition to form a unit dose product. A low decrease in pouch height over time, particularly over a range of temperatures, can be indicative of stability of the detergent composition in the pouch. For example, in some aspects, a height of the pouch does not decrease by more than about 15% (e.g., does not decrease by more than about 14%, about 13%, about 12%, about 11%, about 10%, about 9%, about 8%, about 7%, about 6%, about 5%, about 4%, about 3%, about 2%, or about 1%) over a temperature range of 0° F. to 125° F. (−17.8° C. to 51.7° C.) over a set period of time (e.g., 1 week). In some aspects, pack height is measured 0° F. (−17.78° C.), 40° F. (4.44° C.), 75° F. (23.89° C.), 105° F. (40.56° C.), or 125° F. (51.67° C.) for one week.

The term "percent swelling" or "% swelling" as used in the present application means the percent increase or decrease in weight, of a water-soluble film material, such as a polyvinyl alcohol strip, following submersion in a detergent composition for a given period of time, for example twenty-four hours (hr). The percent swelling is calculated as described in the examples by taking a post-soaking weight, subtracting an initial, pre-soaking weight, and dividing by the initial, pre-soaking weight.

In some aspects, the detergent composition described herein has a percent swelling rate of not more than about 30% following a 24 hr test. In some aspects, the detergent composition described herein has a percent swelling from about 20% to about 30% following a 24 hr test, or about 21% to about 30%, about 22% to about 30%, about 23% to about 30%, about 24% to about 30%, about 25% to about 30%, about 26% to about 30%, about 27% to about 30%, about 28% to about 30%, or about 29% to about 30%.

The term "Zein score" or "Zein number" as used in the present application refers to a score or number measured using a Zein test (see, e.g., Gott, E., Aesthet. Medzin., Tenside 15: 313 (1966)), as described in the examples. A Zein test determines the extent of denaturation of Zein corn protein after exposure to a surfactant for a given period of time. Generally, the higher the Zein score, the greater the skin irritation potential.

In some aspects, the detergent compositions described herein have a Zein score of not more than about 1.5% dissolved zein when tested at a 3% dilution. In other aspects the detergent compositions described herein have a Zein score of not more than 1% dissolved zein when tested at a 3% dilution. In other aspects the detergent compositions described herein have a Zein score of not more than 0.5% dissolved zein when tested at a 3% dilution. In other aspects, the detergent compositions described herein have a Zein score of less than about 1.5% dissolved zein when tested at a 3% dilution. In other aspects the detergent compositions described herein have a Zein score of less than 1% dissolved zein when tested at a 3% dilution. In other aspects the detergent compositions described herein have a Zein score of less than 0.5% dissolved zein when tested at a 3% dilution. In other aspects, the detergent compositions described herein at a 3% dilution have a Zein score of from about 0.01% to about 1.5%, from about 0.01% to about 1.25%, about 0.01% to about 1%, or about 0.01% to about 0.75%, or about 0.01% to about 0.5% dissolved zein.

Detergent Composition

In some aspects, the present disclosure is directed to a unit dose product comprising a pouch formed from a water-soluble film material and a detergent composition disposed within the pouch. The detergent composition comprises about 5 to about 25 wt % water, about 20 to about 40 wt % of at least one surfactant, about 35 to about 55 wt % non-aqueous solvent comprising polyethylene glycol and glycerin, and no enzyme, wherein a percent swelling is not more than about 30% in a 24 hr test.

It was discovered that a mild detergent composition (e.g., a composition with a low Zein score), that does not affect swelling of the unit dose pouch to a substantial degree (i.e., a composition with a low percent swelling effect) can be provided when a detergent composition comprising about 35 to about 55 wt % of non-aqueous solvent comprising polyethylene glycol and glycerin is used. The detergent composition described herein has a percent swelling rate of the unit dose product of not more than about 30% following a 24 hr test. In some aspects, the detergent composition described herein has a percent swelling of the unit dose product from about 20% to about 30% following a 24 hr test, or about 21% to about 30%, about 22% to about 30%, about 23% to about 30%, about 24% to about 30%, about 25% to about 30%, about 26% to about 30%, about 27% to about 30%, about 28% to about 30%, or about 29% to about 30%. In some aspects, the detergent composition described herein has a percent swelling of the unit dose product of about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, or about 30%.

In some aspects of the unit dose product, a height of the pouch does not decrease by more than about 15% (e.g., does not decrease by more than about 14%, about 13%, about 12%, about 11%, about 10%, about 9%, about 8%, about 7%, about 6%, about 5%, about 4%, about 3%, about 2%, or about 1%) over a temperature range of 0° F. to 125° F. (−17.8° C. to 51.7° C.) over a set period of time (e.g., 1 week). In some aspects, pack height is measured 0° F. (−17.78° C.), 40° F. (4.44° C.), 75° F. (23.89° C.), 105° F. (40.56° C.), or 125° F. (51.67° C.) for one week.

In some aspects, the detergent composition has a Zein score that is less than 1.5% dissolved zein when tested on a 3% dilution of the detergent composition when measured in accordance with the method set forth herein and in Gott (Aesthet. Medzin., Tenside 15: 313 (1966)), the disclosure of which is incorporated herein by reference in its entirety. In some aspects the detergent composition described herein has a Zein score not more than about 1.4% dissolved zein when tested on a 3% dilution, not more than about 1.3%, not more than about 1.2%, not more than about 1.1%, not more than about 1.0%, not more than about 0.9%, not more than about 0.8%, not more than about 0.7%, not more than about 0.6%, or not more than about 0.5% dissolved zein. In some aspects, the detergent composition has a Zein score of less than 1% dissolved zein when tested on a 3% dilution. In some aspects, the detergent composition has a Zein score of less than 0.5% dissolved zein when tested on a 3% dilution. In other aspects, the detergent compositions described herein at a 3% dilution have a Zein score of from about 0.01% to about 1.5%, from about 0.01% to about 1.25%, about 0.01% to about 1%, or about 0.01% to about 0.75%, or about 0.01% to about 0.5% dissolved zein.

In some aspects, the detergent composition comprises from about 5 wt % to about 25 wt % of water relative to the total weight of the composition. For example, the water content can be from about 5 wt % to about 23 wt %, about 5 wt % to about 21 wt %, about 5 wt % to about 18 wt %, about 5 wt % to about 15 wt %, about 5 wt % to about 12 wt %, about 5 wt % to about 10 wt %, about 6 wt % to about 23 wt %, about 6 wt % to about 20 wt %, about 6 wt % to about 18 wt %, about 6 wt % to about 15 wt %, about 6 wt % to about 12 wt %, about 6 wt % to about 10 wt %, about 7 wt % to about 23 wt %, about 7 wt % to about 20 wt %, about 7 wt % to about 18 wt %, about 7 wt % to about 15 wt %, about 7 wt % to about 12 wt %, about 7 wt % to about 10 wt %, about 8 wt % to about 23 wt %, about 8 wt % to about 20 wt %, about 8 wt % to about 18 wt %, about 8 wt % to about 15 wt %, about 8 wt % to about 12 wt %, about 8 wt % to about 10 wt %, about 9 wt % to about 23 wt %, about 9 wt % to about 20 wt %, about 9 wt % to about 18 wt %, about 9 wt %, about 15 wt %, about 9 wt %, about 10 wt %, about 12 wt %, about 15 wt %, about 18 wt %, about 20 wt %, about 21 wt %, about 22%, about 23%, about 24 wt %, about 19 wt %, about 18 wt %, about 17 wt %, about 16 wt %, about 15 wt %, about 14 wt %, about 13 wt %, about 12 wt %, about 11 wt %, about 10 wt %, about 9 wt %, about 8 wt %, about 7 wt %, about 6 wt %, about 5 wt %, about 4 wt %, or about 3 wt % of the total weight of the composition.

The detergent composition comprises about 35 wt % to about 55 wt % of non-aqueous solvent comprising polyethylene glycol and glycerin in addition to water.

The non-aqueous solvent comprises polyethylene glycol (PEG), which can have the structure:

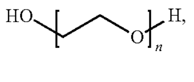

wherein n is an integer from 1 to 25 (e.g., 1 to 24, 1 to 23, 1 to 22, 1 to 21, 1 to 20, 1 to 18, 1 to 15, 1 to 12, 1 to 10, 2 to 25, 2 to 24 to 2 to 23, 2 to 22, 2 to 21, 2 to 20, 2 to 18, 2 to 15, 2 to 12, 2 to 10, 4 to 25, 4 to 23, 4 to 20, 4 to 18, 4 to 15, 4 to 12, 4 to 10, 7 to 25, 7 to 23, 7 to 20, 7 to 18, 7 to 15, 7 to 12, 7 to 10, 9 to 25, 9 to 23, 9 to 20, 9 to 18, 9 to 15, 9 to 12, etc.). In some aspects, n can be 1, 2, 3, 4, 5, 6, 7, 8, 9, 10, 11, 12, 13, 14, 15, 16, 17, 18, 19, 20, 21, 22, 23, 24, or 25.

In some aspects, the PEG has a molecular weight (including a number average molecular weight) of about 60 to about 1500 g/mol (e.g., about 60 to about 1200 g/mol, about 60 to about 1000 g/mol, about 100 to about 1500 g/mol, about 100 to about 1200 g/mol, about 100 to about 1000 g/mol, about 200 to about 1500 g/mol, about 200 to about 1200 g/mol, about 200 to about 1000 g/mol, about 300 to about 1500 g/mol, about 300 to about 1200 g/mol, about 300 to about 1000 g/mol, about 400 to about 1500 g/mol, about 400 to about 1200 g/mol, about 400 to about 1000 g/mol, about 200 g/mol, about 400 g/mol, about 600 g/mol, about 800 g/mol, or about 1000 g/mol).

In some aspects, the non-aqueous solvent comprises polyethylene glycol and glycerin in a weight ratio of about 1:1 to about 2:1. For example, the weight ratio can be about 1:1, about 1.1:1, about 1.2:1, about 1.3:1, about 1.4:1, about 1.5:1, about 1.6:1, about 1.7:1, about 1.8:1, about 1.9:1, or about 2:1.

In some aspects, the non-aqueous further comprises an alcohol (e.g., a $C_{1-4}$ alcohol), a polyol (e.g., a diol, a triol, or higher), or a combination thereof. Suitable examples of an alcohol and polyol include, e.g., ethanol, n-propanol, isopropanol, ethylene glycol, diethylene glycol, triethylene glycol, diethylene glycol monobutyl ether, propylene glycol, dipropylene glycol, tripropylene glycol, dipropylene glycol monobutyl ether, 1,3-butylene glycol, 1,4-butylene glycol, 1-(1-butoxy-2-propoxy)-2-propanol, 2-methyl-2,4-pentanediol, 1,5-pentanediol, 1,6-hexanediol, or a combination thereof.

In some aspects, the non-aqueous solvent further comprises propylene glycol. In some aspects, the PEG, propylene glycol, and glycerin are present in a weight ratio of about 1:0.5:1. In some aspects, the non-aqueous solvent comprises PEG, propylene glycol, and glycerin in a weight ratio of about 2:0.25:2, about 1.5:0.5:1.5, about 1:0.5:1, or about 1:1:1.

In some aspects, the non-aqueous solvent further comprises ethanol. In some aspects, the non-aqueous solvent comprises PEG, glycerin, propylene glycol, and ethanol.

In some aspects, the non-aqueous solvent comprises about 35 to about 55 wt % of non-aqueous solvent comprising polyethylene glycol and glycerin. For example, the total non-aqueous solvent content can be present in an amount from about 35 wt % to about 55 wt %, about 38 wt % to about 53 wt %, about 38 wt % to about 51 wt %, about 38 wt % to about 50 wt %, about 38 wt % to about 48 wt %, about 40 wt % to about 55 wt %, about 40 wt % to about 53 wt %, about 40 wt % to about 51 wt %, about 40 wt % to about 50 wt %, about 42 wt % to about 55 wt %, about 42 wt % to about 53 wt %, about 42 wt % to about 51 wt %, about 42 wt % to about 50 wt %, about 45 wt % to about 55 wt %, about 45 wt % to about 53 wt %, about 45 wt % to about 51 wt %, about 45 wt % to about 50 wt %, about 55 wt %, about 54 wt %, about 53 wt %, about 52 wt %, about 51 wt %, about 50 wt %, about 49 wt %, about 48 wt %, about 47 wt %, about 46 wt %, about 45 wt %, about 44 wt %, about 43 wt %, about 42 wt %, about 41 wt %, about 40 wt %, about 39 wt %, about 38 wt %, about 37 wt %, about 36 wt %, or about 35 wt % of the total weight of the composition. In some aspects, the detergent composition comprises about 40 to about 50 wt % of non-aqueous solvent.

The detergent composition does not comprise any enzymes and relies on surfactants for soil removal. The detergent composition comprises about 20 to about 40 wt % of at least one surfactant. In some aspects, the at least one (e.g., 1, 2, 3, 4, 5, or 6, etc.) surfactant is an anionic surfactant, a cationic surfactant, a zwitterionic surfactant, a nonionic surfactant, or a combination thereof. For example, the detergent composition can comprise a combination of anionic surfactants and nonionic surfactants.

The anionic surfactant comprises a hydrophobic tail group (e.g., a linear aliphatic chain) and an anionic hydrophilic head group. The hydrophobic tail group can be a $C_8$-$C_{18}$ aliphatic ("fatty") group that contains 0 or 1 double bond and can be optionally substituted with one or more (e.g., 1, 2, 3, or 4) substituents selected from an aryl group (e.g., phenyl, benzyl, naphthyl), alkyl, or fluoro (e.g., perfluorinated). The anionic hydrophilic group can be, for example, a sulfate ($—OSO_3^-$), sulfonate ($—SO_3^-$), a phosphate ($—OPO_3^{3-}$), a carboxylate ($—C(O)O^-$), or the conjugate base of an organic acid. In some aspects, polyethylene glycol repeat units designated as "ether" can be disposed between the hydrophobic tail group (e.g., a fatty group) and hydrophilic head group.

In some aspects, the anionic surfactant comprises an alkyl sulfate, an alkyl sulfonate, a fatty acid salt, a bile acid salt, a glutamic acid salt, a cholic acid salt, a carboxylic poly (ethylene glycol) ether, a taurate, or a combination thereof. Typically, the salt will be a Group I (e.g., lithium, sodium, potassium, etc.), Group II (e.g., magnesium, calcium, etc.), or ammonium salt.

Examples of an alkyl sulfate include, e.g., a fatty sulfate (e.g., octylsulfate, decyl sulfate, lauryl (dodecyl) sulfate, myristyl sulfate), dioctyl sodium sulfosuccinate, and an alkyl ether sulfate (also called an alcohol ethoxysulfate)). Other examples of fatty sulfate include, e.g., 3-sulfopropyl ethoxylate laurylphenyl ether and coco (coconut fatty acid) sulfate. Examples of an alkyl sulfonate include, e.g., a linear alkylbenzene sulfonate (e.g., sodium laurylbenzene sulfonate), a perfluoroalkyl sulfonate (e.g., perfluorooctyl sulfonate, perfluorobutyl sulfonate), and a methyl ester sulfonate. Examples of a fatty acid salt include, e.g., a caprylate, a laurate, a palmitate, a myristate, and a stearate. Other anionic surfactants include a bile acid salt, a glutamic acid salt (e.g., N-myristoyl-1-glutamic acid), a glycolic acid salt, a cholic acid salt, a carboxylic poly(ethylene glycol) ether (e.g., glycolic acid ethoxylate laurylphenyl ether, glycolic acid ethoxylate oleyl ether), a taurate (e.g., sodium oleic acid methyl taurate, sodium coconut fatty acid methyl taurate, sodium cocyl methyl taurate), or a combination thereof.

In some aspects, the anionic surfactant comprises an alkyl ether sulfate (AES). In general, the AES will have the structure $R^1—O-(EO)_nSO_3^-X^+$, in which $R^1$ is a $C_8$-$C_{18}$ alkyl group (linear or branched), EO is polyethoxylate, n is typically 1 to 8 (e.g., 1, 2, 3, 4, 5, 6, 7, or 8), and $X^+$ is a cation that balances the charge of the sulfonate. The $C_8$-$C_{18}$ alkyl group is an alkyl comprising 8 to 18 carbons (e.g., 8 to 16 carbons, 10 to 18 carbons, 10 to 16 carbons, 12 to 18 carbons, 12 to 16 carbons, such as $C_8$ alkyl, $C_9$ alkyl, $C_{10}$ alkyl, $C_{11}$ alkyl, $C_{12}$ alkyl, $C_{13}$ alkyl, $C_{14}$ alkyl, $C_{15}$ alkyl, $C_{16}$ alkyl, $C_{17}$ alkyl, or Cis alkyl). In some aspects, the cation $X^+$ can be of formula (I) and/or (II) is a Group I cation, such as sodium cation or potassium cation, particularly sodium cation. In some aspects, the AES is sodium laureth sulfate.

In some aspects, the anionic surfactant comprises an alkyl sulfate (e.g., a lauryl sulfate), a coco fatty acid, a linear alkylbenzene sulfonate, an alkyl ether sulfate, a methyl ester sulfonate, or a combination thereof. In some aspects, the anionic surfactant comprises a linear alkylbenzene sulfonate, an alcohol ethoxysulfate, a methyl ester sulfonate, or a combination thereof.

The linear alkylbenzene sulfonate can have the structure of formula (I):

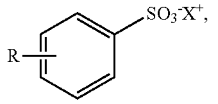

(I)

in which R is a linear $C_{10}$-$C_{18}$ (e.g., $C_{10}$, $C_{11}$, $C_{12}$, $C_{13}$, $C_{14}$, $C_{15}$, $C_{16}$, $C_{17}$, and $C_{18}$) alkyl, and $X^+$ is a cation that balances the charge of the sulfonate. The benzylsulfonate can be at any suitable position (e.g., at the 1-position, 2-position, 3-position, 4-position, 5-position, 6-position, 7-position, 8-position, or 9-position) on the alkyl R. With respect to the benzene ring, the alkyl R and sulfonate can be ortho, meta, or para to each other. In some aspects, the alkyl R and sulfonate are para to one another.

In general, the methyl ester sulfonate can have the structure of formula (II):

(II)

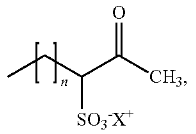

in which n is 10 to 16 (e.g., 10, 11, 12, 13, 14, 15, or 16) to form a $C_{12}$-$C_{18}$ alkyl (e.g., $C_{12}$, $C_{13}$, $C_{14}$, $C_{15}$, $C_{16}$, $C_{17}$, and $C_{18}$) and $X^+$ is a cation that balances the charge of the sulfonate.

In some aspects, the cation $X^+$ can be of formula (I) and/or (II) is a Group I cation, such as sodium cation or potassium cation, particularly sodium cation. In some aspects, the anionic surfactant comprises a methyl ester sulfonate.

In some aspects, the detergent composition does not comprise or is substantially free of a linear alkylbenzene sulfonate.

The cationic surfactant comprises a hydrophobic tail group (e.g., a linear aliphatic chain) and a cationic hydrophilic head group. The hydrophobic tail group can be a $C_8$-$C_{18}$ aliphatic ("fatty") group that contains 0 or 1 double bond and can be optionally substituted with one or more (e.g., 1, 2, 3, or 4) substituents selected from an aryl group (e.g., phenyl, benzyl, naphthyl) or alkyl. The cationic hydrophilic group can be, for example, an amino group that can be quaternized, such as trialkylammonium. The counterion can be any suitable anion that can balance the charge. In some aspects, the counterion is an anion with a −1 charge (e.g., $X^-$), such as a halide (e.g., chloride, bromide, etc.), hydroxy, or tosylate.

In some aspects, the surfactant can be alkoxylated, in which polyalkylene glycol (e.g., polyethylene glycol, polypropylene glycol) repeat units can be disposed between the hydrophobic tail group (e.g., a fatty group) and hydrophobic head group.

In some aspects, the cationic surfactant can be a fatty amine salt or a quaternary ammonium compound. In some aspects, the cationic surfactant comprises a fatty amine salt, a fatty diamine salt, a coco amine alkoxylate, an alkoxylated amine, an alkoxylated diamine, fatty quaternary ammonium compound, a fatty amide quaternary ammonium compound, an alkoxylated quaternary ammonium compound, a benzalkyl quaternary ammonium compound, or a combination thereof. Examples of the fatty amine salt include, e.g., a $C_8$-$C_{18}$ fatty amine salt (e.g., $R^1$—$NH_3^+$, in which $R^1$ is a $C_8$-$C_{18}$ alkyl group). Examples of a fatty diamine salt include, e.g., $R^1$—$NH_2^+$—$R^2$—$NH_3^+$, in which $R^1$ is a $C_8$-$C_{18}$ alkyl group and $R^2$ is a $C_{1-6}$ alkyl). Examples of an alkoxylated amine and an alkoxylated diamine include a polyethoxylated fatty amine and diamine, respectively. Examples of a fatty quaternary ammonium compound include, e.g., $R^1$—$NR^3_3{}^+$, in which $R^1$ is a $C_8$-$C_{18}$ alkyl group and each $R^3$ is a $C_{1-4}$ alkyl, phenyl, or benzyl (e.g., alkyltrimethylammonium halide, alkyltrimethylammonium tosylate, alkyltrimethylammonium hydroxide). Examples of a fatty amide quaternary ammonium compound include, e.g., $R^1$—C(O)N—$R^2$—$NR^3_3{}^+$, in which $R^1$ is a $C_8$-$C_{18}$ alkyl group, $R^2$ is a $C_{1-6}$ alkyl, and each $R^3$ is a $C_{1-4}$ alkyl, phenyl, or benzyl (e.g., trimethylammonium stearamide). Examples of an alkoxylated quaternary ammonium compound include, e.g., a polyethoxylated quaternary ammonium compound. Examples of a benzalkyl quaternary ammonium compound include, e.g., benzyl-$C_8$-$C_{18}$ alkyldimethylammonium (e.g., benzalkonium chloride).

The zwitterionic surfactant is amphoteric and comprises a hydrophobic tail group (e.g., a linear aliphatic chain) and a hydrophilic head group with both a cationic charge and an anionic charge. The hydrophobic tail group can be a $C_8$-$C_{18}$ aliphatic ("fatty") group that contains 0 or 1 double bond and can be optionally substituted with one or more (e.g., 1, 2, 3, or 4) substituents selected from an aryl group (e.g., phenyl, benzyl, naphthyl) or alkyl. The cationic moiety can be, for example, a quaternary ammonium group, such as dialkylammonium or trialkylammonium (e.g., $C_1$-$C_4$ alkyl, such as methyl). The anionic moiety can be, for example, oxo ($O^-$), a sulfate (—$OSO_3^-$), sulfonate (—$SO_3^-$), a phosphate (—$OPO_3^{3-}$), a carboxylate (—C(O)$O^-$), or the conjugate base of an organic acid.

In some aspects, the zwitterionic surfactant comprises a betaine, a sulfonated quaternary ammonium compound, a phosphonated quaternary ammonium compound, a trialkylamine N-oxide, or a combination thereof.

Examples of a betaine include, e.g., $C_8$-$C_{18}$ alkyl betaine, cocobetaine, cocamidopropyl betaine, amidosulfobetaine-16, hexadecyl hydroxypropyl sulfobetaine, lauryl-N,N-(dimethylammonio) butyrate, and lauryl-N,N-(dimethyl)-glycinebetaine. Examples of a sulfonated quaternary ammonium compound include, e.g., 3-(N,N-dimethyl-octylammonio)propanesulfonate, 4-(N,N-dimethyl-dodecylammonio)butanesulfonate, 3-{N,N-dimethyl-N-[3-(4-octylbenzoylamino)propyl]ammonio} propanesulfonate, 3-[(3-cholamidopropyl)dimethylammonio]-1-propanesulfonate, 3-([3-cholamidopropyl] dimethylammonio)-2-hydroxy-1-propanesulfonate, coco(amidopropyl)dimethylammonio-2-hydroxypropanesulonate, lauryl-N,N-(dimethylammonio) butyrate, lauryl-N,N-(dimethyl)-propanesulfonate, 3-(4-tert-butyl-1-pyridinio)-1-propanesulfonate, 3-(1-pyridinio)-1-propanesulfonate, and 3-(benzyl-dimethylammonio) propanesulfonate. Examples of a phosphonated quaternary ammonium compound include, e.g., a phosphocholine, such as N-dodecylphosphocholine and hexadecyl phosphocholine. Examples of a trialkylamine N-oxide include, e.g., $R^1$—N($O^-$)$R^2_2{}^+$, in which $R^1$ is a $C_8$-$C_{18}$ alkyl group, $R^2$ is a $C_{1-4}$ alkyl, such as lauryldimethylamine N-oxide and 4-ethyl-N,N-2-trimethyloctan-1-amine oxide.

The nonionic surfactant comprises a hydrophobic tail group (e.g., a linear aliphatic chain) and an uncharged (i.e., neutral) hydrophilic head group. The hydrophobic tail group can be a $C_8$-$C_{18}$ aliphatic ("fatty") group that contains 0 or 1 double bond and can be optionally substituted with one or more (e.g., 1, 2, 3, or 4) substituents selected from an aryl group (e.g., phenyl, benzyl, naphthyl) or alkyl. The uncharged hydrophilic group can be, for example, an alkoxylate, such as ethoxylate ((—$CH_2CH_2O$—$)_n$; EO or PEO) or propoxylate ((—$CH(CH_3)CH_2O$—$)_m$; PO or PPO), in which n and m are the same or different and each is an integer of 1 to 100 (e.g., 1 to 90, 1 to 80, 1 to 70, 1 to 60, 1 to 50, 1 to 40, 1 to 30, 1 to 20, 1 to 15, 1 to 14, 1 to 13, to 13, 1 to 12, 1 to 11, 1 to 10, 1 to 9, 1 to 8, 1 to 7, 1 to 6, 1 to 5, or 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, or 100).

In some aspects, the nonionic surfactant comprises a fatty alcohol alkoxylate, a fatty acid alkoxylate, an alkyl phenol ethoxylate, an alkoxylated amine, an alkyl glucoside, a fatty amide alkoxylate, a diester of alkoxylated fatty acid, an alkoxylated methyl ester of fatty acid (e.g., a methyl ester ethoxylate), a glycerol fatty ester, castor oil alkoxylate, an ethylene oxide-propylene oxide block copolymer, a phenol alkoxylate, or a combination thereof.

Examples of a fatty alcohol alkoxylate include, e.g., $C_8$-$C_{18}$ ethoxylate and $C_8$-$C_{18}$ propoxylate. Examples of a fatty acid alkoxylate include, e.g., $R^1$—C(O)O-EO-H, in which $R^1$ is a $C_8$-$C_{18}$ alkyl group and EO is polyethylene oxide. Examples of an alkyl phenol ethoxylate include, e.g., $R^1$-phenyl-O(EO)—H, in which $R^1$ is a $C_8$-$C_{18}$ alkyl group and EO is polyethylene oxide. Examples of an alkoxylated amine include, e.g., ethoxylated $C_8$-$C_{18}$ alkylamine, tallow amine ethoxylate, lauryl amine ethoxylate ether, 2-2-(2-hydroxyethoxy)ethylaminoethanol, bis(hydroxyethoxy-ethyl)amine, 2,2'-((2-(2-hydroxyethoxy)ethyl)azanediyl)di-ethanol, and coco bis(2-hydroxyethyl) amine. Example of an alkyl glucoside include, e.g., alkyl polyglucoside, such as $C_8$-$C_{18}$ polyglucoside which can include 1 to 3 glucoside units. Examples of a fatty amide alkoxylate include $R^1$—C(O)NH-(EO)—H, in which $R^1$ is a $C_8$-$C_{18}$ alkyl group and EO is polyethylene oxide. Examples of a diester of alkoxylated fatty acid include, e.g., $R^1$—C(O)O-EO—C(O)—$R^2$, in which $R^1$ and $R^{1'}$ is a $C_8$-$C_{18}$ alkyl group and EO is polyethylene oxide. Examples of an alkoxylated methyl ester of fatty acid (e.g., a methyl ester ethoxylate) include e.g., $R^1$—C(O)O-EO—$R^2$, in which $R^1$ is a $C_8$-$C_{18}$ alkyl group, $R^2$ is a $C_1$-$C_4$ alkyl group, and EO is polyethylene oxide. Examples of a glycerol fatty ester include, e.g., an ester formed from glycerol and a fatty acid (e.g., $C_8$-$C_{18}$ alkyl), such as 2-ethylhexyl oleate, glycerol trioleate, glyceryl monooleate, glyceryl monotallate, n-butyl stearate, neopentylglycol dioleate, pentaerythritol monooleate, pentaerythritol tetraoleate, and trimethylolpropane trioleate. An example of a castor oil alkoxylate is polyethoxylated castor oil. Examples of an ethylene oxide-propylene oxide block copolymer include, e.g., $R^3O$-$(EO)_n$—$(PO)_m$-$(EO)_n$—$R^4$, in which $R^3$ and $R^4$ are the same or different and each is a $C_1$-$C_7$ alkyl, a $C_5$-$C_6$ cycloalkyl, or an aryl; n is an integer of 30-150 (e.g., about 40-135, about 42-133), and m is an integer of about 10-100 (e.g., about 10-80, about 20-70, about 21-68) and block copolymers such as, PEO-PPO-PEO and PPO-PEO-PPO. Examples of a phenol alkoxylate include, e.g., $R^5$—$C_6H_4$-(EO)—H, wherein $R^5$ is hydrogen or a $C_1$-$C_{18}$ alkyl group, and EO is polyethylene oxide, such as octyphenol ethoxylate, nonylphenol ethoxylate, 2-phenoxydecan-1-ol, bisphenol ethoxylate, and a styrenated phenol ethoxylate (e.g., tristyrylphenol ethoxylate).

In some aspects, the methyl ester ethoxylate (MEE) is of the formula: $R^1$—C(═O)O-$(EO)_n$—$CH_3$, wherein $R^1$ is a $C_8$-$C_{24}$ alkyl group, EO is polyethoxylate, and n is an integer of moles from 5 to 30 (i.e., n is 5, 6, 7, 8, 9, 10, 11, 12, 13, 14, 15, 16, 17, 18, 19, 20, 21, 22, 23, 24, 25, 26, 27, 28, 29, or 30). The $C_8$-$C_{24}$ alkyl group is an alkyl comprising 8 to 24 carbons (e.g., 8 to 22 carbons, 8 to 20 carbons, 8 to 18 carbons, 8 to 16 carbons, 10 to 24 carbons, 10 to 22 carbons, 10 to 20 carbons, 10 to 18 carbons, 10 to 16 carbons, 12 to 24 carbons, 12 to 22 carbons, 12 to 20 carbons, 12 to 18 carbons, 12 to 16 carbons, such as $C_8$ alkyl, $C_9$ alkyl, $C_{10}$ alkyl, $C_{11}$ alkyl, $C_{12}$ alkyl, $C_{13}$ alkyl, $C_{14}$ alkyl, $C_{15}$ alkyl, $C_{16}$ alkyl, $C_{17}$ alkyl, $C_{18}$ alkyl, $C_{19}$ alkyl, $C_{20}$ alkyl, $C_{21}$ alkyl, $C_{22}$ alkyl, $C_{23}$ alkyl, or $C_{24}$ alkyl). In some aspects, the MEE is of formula $R^1$—C(═O)O-$(EO)_n$—$CH_3$, in which $R^1$ is $C_{17}$ alkyl, and n is 10.

In some aspects, the nonionic surfactant comprises an alcohol ethoxylate as a nonionic surfactant of the formula $R^1$-$(EO)_n$—OH, wherein $R^1$ is a $C_{12}$-$C_{18}$ alkyl group, EO is ethoxylate, and n is an integer of moles from 1 to 15. In general, the alcohol ethoxylate will have a chemical structure of formula (III):

(III)

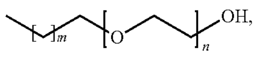

in which m is an integer of 10 to 16 (e.g., 10, 11, 12, 13, 14, 15, or 16) to form a $C_{12}$-$C_{18}$ fatty alkyl (e.g., $C_{12}$, $C_{13}$, $C_{14}$, $C_{15}$, $C_{16}$, $C_{17}$, and $C_{18}$), and n is an integer of 1 to 15 (e.g., 1, 2, 3, 4, 5, 6, 7, 8, 9, 10, 11, 12, 13, 14, or 15). The alcohol ethoxylate typically will contain a range of alkyl groups, such as $C_{12}$-$C_{15}$ or $C_{12}$-$C_{14}$ and can contain branches. In some aspects, the alcohol ethoxylate can contain 1 to 15 moles (e.g., 1 to 12 moles, 1 to 9 moles, 1 to 7 moles, or about 7 moles) of ethoxylate per mole of alcohol. In some aspects, the alcohol ethoxylate can be a $C_{12}$-$C_{18}$ alcohol ethoxylate with 1-15 moles of ethoxylate. In some aspects, the alcohol ethoxylate comprises a $C_{12}$-$C_{15}$ alcohol ethoxylate with 7 moles of ethoxylate. In some aspects, the alcohol ethoxylate comprises ethoxylated lauryl alcohol.

In some aspects, the detergent composition comprises at least one anionic surfactant and at least one nonionic surfactant.

In some aspects, the detergent composition comprises at least one (e.g., 1, 2, 3, 4, 5, or 6, etc.) surfactant selected from a non-ionic alcohol ethoxylate (AE), an alkyl ether sulfate (AES), or a combination of both. In an aspect, the at least one surfactant comprises AE and AES with an AE to AES weight ratio of at least about 3:1 (e.g., at least about 3.5:1, at least about 4:1, at least about 4.5:1, at least about 5:1, at least about 5.5:1, or at least about 6:1). In some aspects, the AE to AES weight ratio is between about 4:1 and about 6:1.

In some aspects, the at least one surfactant comprises an alkyl ether sulfate, a alcohol ethoxylate (e.g., ethoxylated lauryl alcohol), a methyl ester sulfonate, a linear alkyl benzene sulfonate, an alkoxylated methyl ester of fatty acid (e.g., a methyl ester ethoxylate), and coco fatty acid. In some aspects, the detergent composition does not comprise or is substantially free of a linear alkylbenzene sulfonate (LAS).

In some aspects, the detergent composition comprises from about 20 wt % to about 40 wt % of at least one surfactant (e.g., an anionic surfactant, a nonionic surfactant, or a combination thereof) relative to the total weight of the composition. For example, the total surfactant content can be present in an amount from about 20 wt % to about 40 wt %, about 18 wt % to about 40 wt %, about 18 wt % to about 38 wt %, about 18 wt % to about 36 wt %, about 18 wt % to about 35 wt %, about 22 wt % to about 40 wt %, about 22 wt % to about 38 wt %, about 22 wt % to about 36 wt %, about 22 wt % to about 35 wt %, about 24 wt % to about 40 wt %, about 24 wt % to about 38 wt %, about 24 wt % to about 36 wt %, about 24 wt % to about 35 wt %, about 25 wt % to about 40 wt %, about 25 wt % to about 38 wt %, about 25 wt % to about 36 wt %, about 25 wt % to about 35 wt %, about 40 wt %, about 39 wt %, about 38 wt %, about 37 wt %, about 36 wt %, about 35 wt %, about 34 wt %, about 33 wt %, about 32 wt %, about 31 wt %, about 30 wt %, about 29 wt %, about 28 wt %, about 27 wt %, about 26 wt %, or about 25 wt % of the total weight of the composition. In some aspects, the detergent composition comprises about 25 to about 35 wt % of at least one surfactant.

In some aspects, the surfactant to solvent weight ratio ranges from about 1:1 to about 1:1.5. For example, the surfactant to solvent weight ratio can be about 1:1, about 1:1.1, about 1:1.2, about 1:1.3, about 1:1.4:1, or about 1:1.5.

In some aspects, the detergent composition can have a pH of about 6.5 to about 12 (e.g., about 7 to about 12, about 7.5 to 12, about 8 to about 12, about 8.5 to 12, about 9 to about 12, about 9.5 to about 12, about 10 to about 12, about 10.5 to about 12, about 11 to about 12, about 11.5 to about 12, about 6.5 to about 11, about 7 to about 11, about 7.5 to about 11, about 8 to about 11, about 8.5 to about 11, about 9 to about 11, about 9.5 to about 11, about 10 to about 11, about 6.5 to about 10, about 7 to about 10, about 7.5 to about 10, about 8 to about 10, about 8.5 to about 10, about 9 to about 10, about 9.5 to about 10, about 6.5 to about 9, about 7 to about 9, about 7.5 to about 9, about 8 to about 9, about 8.5 to about 9). In some aspects, the detergent composition has a pH of greater than 7 (e.g., about 7.1, about 7.2, about 7.3, about 7.4, about 7.5, about 7.6, about 7.7, about 7.8, or about 7.9) or greater. In some aspects, the detergent composition has a pH of about 8 to about 9. In some aspects, the detergent composition has a pH of about 7.1, about 7.2, about 7.3, about 7.4, about 7.5, about 7.6, about 7.7, about 7.8, about 7.9, about 8, about 8.1, about 8.2, about 8.3, about 8.4, about 8.5, about 8.6, about 8.7, about 8.8, about 8.9, about 9, about 9.1, about 9.2, about 9.3, about 9.4, about 9.5, about 9.6, about 9.7, about 9.8, about 9.9, about 10, about 10.1, about 10.2, about 10.3, about 10.4, about 10.5, about 10.6, about 10.7, about 10.8, about 10.9, about 11.1, about 11.2, about 11.3, about 11.4, about 11.5, about 11.6, about 11.7, about 11.8, about 11.9, or about 12. In some aspects, the detergent composition has a pH of about 7 to about 8.

In some aspects, the detergent composition comprises a base, which is any suitable compound with a pKb of about 1 to about 13. In some aspects, the base can be a Group I hydroxide, a Group II hydroxide, monoethanolamine, diethanolamine, triethanolamine, methyl diethanolamine, sodium tetraborate, trisodium phosphate, sodium carbonate, or a combination thereof. In other aspects, the base is a Group I hydroxide, a Group II hydroxide, sodium tetraborate, trisodium phosphate, sodium carbonate, or a combination thereof. In some aspects, the base can be a monoethanolamine, sodium carbonate, or Group I hydroxide (e.g., sodium hydroxide, potassium hydroxide, or a combination of both).

In some aspects, the detergent composition comprises from about 0.1 wt % to about 15 wt % of base (e.g., a Group I hydroxide) relative to the total weight of the composition. For example, the acid can be present in an amount from about 0.1 wt % to about 12 wt %, about 0.1 wt % to about 10 wt %, about 0.5 wt % to about 15 wt %, about 0.5 wt % to about 12 wt %, about 0.5 wt % to about 10 wt %, about 1 wt % to about 15 wt %, about 1 wt % to about 14 wt %, about 1 wt % to about 13 wt %, about 1 wt % to about 12 wt %, about 1 wt % to about 11 wt %, about 1 wt % to about 10 wt %, about 1 wt % to about 9 wt %, about 1 wt % to about 8 wt %, about 1 wt % to about 5 wt %, about 1 wt % to about 3 wt %, about 1.5 wt % to about 15 wt %, about 1.5 wt % to about 10 wt %, about 1.5 wt % to about 8 wt %, about 1.5 wt % to about 5 wt %, about 1.5 wt % to about 3 wt %, about 2 wt % to about 15 wt %, about 2 wt % to about 10 wt %, about 2 wt % to about 8 wt %, about 2 wt % to about 5 wt %, about 2 wt % to about 3 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 2 wt %, about 2.5 wt %, about 3 wt %, about 3.5 wt %, about 4 wt %, about 4.5 wt %, about 5 wt %, about 5.5 wt %, about 6 wt %, about 6.5 wt %, about 7 wt %, about 7.5 wt %, about 8 wt %, about 8.5 wt %, about 9 wt %, about 9.5 wt %, about 10 wt %, about 11 wt %, about 12 wt %, about 13 wt %, about 14 wt %, or about 15 wt % of the total weight of the composition. In some aspects, the detergent composition comprises from about 2 wt % to about 15 wt % or from about 5 to about 10 wt % of base.

To help maintain the pH, in some aspects, the composition can further comprise an acid, which is any suitable compound with a pKa of less than about 10. In some aspects, the acid is an inorganic acid or an organic acid. Examples of an inorganic acid include hydrochloric acid, nitric acid, nitrous acid, sulfuric acid, sulfurous acid, phosphoric acid, boric acid, hydrobromic acid, hydroiodic acid, perchloric acid, and combinations thereof. In some aspects, the acid is a weak acid such that the acid has a pKa of 2 or greater (e.g., pKa is about 2 to about 10). Examples of a weak acid include, e.g., an organic acid or carbonic acid, hydrocyanic acid, phosphoric acid, sulfurous acid, nitrous acid, or a combination thereof.

In some aspects, the acid in the detergent composition is an organic acid, which in some instances can additionally act as a chelating agent. The organic acid can contain one or more (e.g., 1, 2, or 3) carboxylic acid groups, which can be used singly or in combination. For example, monocarboxylic acids include formic acid, acetic acid, propionic acid, butanoic acid, quinic acid, shikimic acid, lactic acid, sorbic acid, caproic acid, capyrylic acid, capric acid, lauric acid, and stearic acid. Di- and tricarboxylic acids include citric acid, isocitric acid, cis-aconitic acid, adipic acid, gluconic acid, glutaric acid, itaconic acid, ascorbic acid, succinic acid, malonic acid, malic acid, maleic acid, fumaric acid, tartaric acid, and oxalic acid. In some aspects, the detergent composition comprises citric acid.

In some aspects, the detergent composition comprises from about 0.1 wt % to about 10 wt % of acid (e.g., an organic acid, such as citric acid) relative to the total weight of the composition. For example, the acid can be present in an amount about 0.5 wt % to about 10 wt %, about 1 wt % to about 10 wt %, about 1 wt % to about 9 wt %, about 1 wt % to about 8 wt %, about 1 wt % to about 5 wt %, about 1 wt % to about 3 wt %, about 1.5 wt % to about 10 wt %, about 1.5 wt % to about 8 wt %, about 1.5 wt % to about 5 wt %, about 1.5 wt % to about 3 wt %, about 2 wt % to about 10 wt %, about 2 wt % to about 8 wt %, about 2 wt % to about 5 wt %, about 2 wt % to about 3 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 2 wt %, about 2.5 wt %, about 3 wt %, about 3.5 wt %, about 4 wt %, about 4.5 wt %, about 5 wt %, about 5.5 wt %, about 6 wt %, about 6.5 wt %, about 7 wt %, about 7.5 wt %, about 8 wt %, about 8.5 wt %, about 9 wt %, about 9.5 wt %, or about 10 wt % of the total weight of the composition.

In some aspects, the detergent composition further comprises at least one additive. For example, the at least one (e.g., 1, 2, 3, 4, 5, or 6, etc.) additive can be selected from a base, performance polymer, an anti-redeposition agent, a defoamer, a bleaching agent, a bleach activator, a chelating agent, an optical brightener, a bitterant, a corrosion inhibitor, and any combination thereof.

In some aspects, the detergent composition comprises from about 1 wt % to about 15 wt % of a total amount of additives relative to the total weight of the composition. For example, the total amount of additives can be from about 1 wt % to about 12 wt %, about 1 wt % to about 10 wt %, about 1 wt % to about 8 wt %, about 1 wt % to about 5 wt %, about 1 wt % to about 3 wt %, about 1.5 wt % to about 15 wt %, about 1.5 wt % to about 12 wt %, about 1.5 wt % to about 10 wt %, about 1.5 wt % to about 8 wt %, about 1.5 wt % to about 5 wt %, about 1.5 wt % to about 3 wt %, about 2 wt % to about 15 wt %, about 2 wt % to about 12 wt %, about 2 wt % to about 10 wt %, about 2 wt % to about 8 wt %, about 2 wt % to about 5 wt %, about 2 wt % to about 3 wt %, about 1 wt %, about 1.1 wt %, about 1.2 wt %, about 1.3 wt %, about 1.4 wt %, about 1.5 wt %, about 2 wt %, about 2.5 wt %, about 3 wt %, about 3.5 wt %, about 4 wt %, about 4.5 wt %, about 5 wt %, about 5.5 wt %, about 6 wt %, about 6.5 wt %, about 7 wt %, about 7.5 wt %, about 8 wt %, about 8.5 wt %, about 9 wt %, about 9.5 wt %, about 10 wt %, about 10.5 wt %, about 11 wt %, about 11.5 wt %, about 12 wt %, about 12.5 wt %, about 13 wt %, about 13.5 wt %, about 14 wt %, about 14.5 wt %, or about 15 wt % of the total weight of the composition.

In some aspects, the detergent composition comprises a performance polymer that improves at least one aspect of a washed textile. In some aspects, the performance polymer improves the cleaning action of the detergent composition, removes or reduces stains, maintains whiteness, protects color, protects the integrity of a textile, provides odor control, or any combination thereof. In some aspects the performance polymer comprises polyethyleneimine ethoxylate, polyethyleneimine ethoxylate propoxylate, a polycarboxylate (e.g., an acrylic homopolymer or copolymer), carboxymethylcellulose, a polyester, polyvinyl pyrrolidone, a copolymer comprising terephthalic acid, a copolymer comprising maleic acid, a copolymer comprising acrylamino tertiary butyl sulfonate, or any combination thereof. In some aspects the performance polymer comprises polyethyleneimine ethoxylate, polyethyleneimine ethoxylate propoxylate, or a combination of both.

In some aspects, the detergent composition comprises from about 1 wt % to about 10 wt % of a performance polymer relative to the total weight of the composition. For example, the performance polymer can be from about 1 wt % to about 8 wt %, about 1 wt % to about 5 wt %, about 1 wt % to about 3 wt %, about 1.5 wt % to about 10 wt %, about 1.5 wt % to about 8 wt %, about 1.5 wt % to about 5 wt %, about 1.5 wt % to about 3 wt %, about 2 wt % to about 10 wt %, about 2 wt % to about 8 wt %, about 2 wt % to about 5 wt %, about 2 wt % to about 3 wt %, about 1 wt %, about 1.1 wt %, about 1.2 wt %, about 1.3 wt %, about 1.4 wt %, about 1.5 wt %, about 2 wt %, about 2.5 wt %, about 3 wt %, about 3.5 wt %, about 4 wt %, about 4.5 wt %, about 5 wt %, about 5.5 wt %, about 6 wt %, about 6.5 wt %, about 7 wt %, about 7.5 wt %, about 8 wt %, about 8.5 wt %, about 9 wt %, about 9.5 wt %, or about 10 wt % of the total weight of the composition.

In some aspects, the detergent composition comprises an anti-redeposition agent that keeps dissolved soil stains stable in the wash water and prevent the stains from redepositing on a textile. In some aspects, the anti-redeposition polymer is biodegradable. The anti-redeposition polymer can be based on acrylic acid, e.g., a homopolymer of acrylic acid, a polycarboxylate based on acrylic acid, a copolymer of acrylic acid and polystyrene, or a copolymer of maleic acid and acrylic acid. Examples of a suitable anti-redeposition polymer include, e.g., sodium polyacrylate, modified polyethylene glycol, styrene-acyrlic acid copolymer, polyethyleneimine, or a combination thereof. In some aspects, the anti-redeposition polymer comprises sodium polyacrylate.

In some aspects, the detergent composition comprises from about 0.001 wt % to about 5 wt % of an anti-redeposition polymer relative to the total weight of the composition. For example, the anti-redeposition polymer can be present in an amount from about 0.001 wt % to about 4 wt %, about 0.001 wt % to about 3 wt %, about 0.001 wt % to about 2 wt %, about 0.001 wt % to about 1 wt %, about 0.005 wt % to about 5 wt %, about 0.005 wt % to about 4 wt %, about 0.005 wt % to about 3 wt %, about 0.005 wt % to about 2 wt %, about 0.005 wt % to about 1 wt %, about 0.01 wt % to about 5 wt %, about 0.01 wt % to about 3 wt %, about 0.01 wt % to about 2 wt %, about 0.01 wt % to about 1 wt %, about 0.05 wt % to about 5 wt %, about 0.05 wt % to about 3 wt %, about 0.05 wt % to about 2 wt %, about 0.05 wt % to about 1 wt %, about 0.1 wt % to about 5 wt %, about 0.1 wt % to about 3 wt %, about 0.1 wt % to about 2 wt %, about 0.1 wt % to about 1 wt %, about 0.001 wt %, about 0.002 wt %, about 0.003 wt %, about 0.004 wt %, about 0.005 wt %, about 0.006 wt %, about 0.007 wt %, about 0.008 wt %, about 0.009 wt %, about 0.01 wt %, about 0.02 wt %, about 0.03 wt %, about 0.04 wt %, about 0.05 wt %, about 0.06 wt %, about 0.07 wt %, about 0.08 wt %, about 0.09 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 2 wt %, about 2.5 wt %, about 3 wt %, about 3.5 wt %, about 4 wt %, about 4.5 wt %, or about 5 wt % of the total weight of the composition.

In some aspects, the detergent composition comprises a defoamer that helps maintain the rise of foam, which can, in some aspects, avoid high foaming or water spilling from a washing machine. In general, the defoamer has a low viscosity. In some aspects the defoamer comprises coconut fatty acid, a silicone, ethylene-bis-stearamide, a fatty acid, a fatty alcohol, or any combination thereof. In some aspects, the defoamer is coconut fatty acid.

In some aspects, the detergent composition comprises from about 1 wt % to about 18 wt % of a defoamer relative to the total weight of the composition. For example, the defoamer can be from about 1 wt % to about 15 wt %, about 1 wt % to about 12 wt %, about 1 wt % to about 10 wt %, about 1 wt % to about 8 wt %, about 1 wt % to about 5 wt %, about 1 wt % to about 3 wt %, about 1.5 wt % to about 10 wt %, about 1.5 wt % to about 8 wt %, about 1.5 wt % to about 5 wt %, about 1.5 wt % to about 3 wt %, about 2 wt % to about 10 wt %, about 2 wt % to about 8 wt %, about 2 wt % to about 5 wt %, about 2 wt % to about 3 wt %, about 1 wt %, about 1.1 wt %, about 1.2 wt %, about 1.3 wt %, about 1.4 wt %, about 1.5 wt %, about 2 wt %, about 2.5 wt %, about 3 wt %, about 3.5 wt %, about 4 wt %, about 4.5 wt %, about 5 wt %, about 5.5 wt %, about 6 wt %, about 6.5 wt %, about 7 wt %, about 7.5 wt %, about 8 wt %, about 8.5 wt %, about 9 wt %, about 9.5 wt %, about 10 wt %, about 11 wt %, about 12 wt %, about 13 wt %, about 14 wt %, about 15 wt %, about 16 wt %, about 17 wt %, or about 18 wt %, of the total weight of the composition. In some aspects, the detergent composition comprises from about 3 wt % to about 10 wt % of a defoamer (e.g., coconut fatty acid) relative to the total weight of the composition.

In some aspects, the detergent composition comprises a bleaching agent (e.g., chlorine or oxygen-releasing bleaching agents) and optionally a bleach activator. In some aspects, the bleaching agent comprises a hydrogen peroxide source as an oxygen-releasing bleaching agent. In some aspects, the hydrogen peroxide source comprises at least one inorganic perhydrate salt comprising a perborate salt, a percarbonate salt, a perphosphate salt, a persulfate salt, a persilicate salt, or a combination thereof. These salts can be counterbalanced by a Group I cation and/or Group II cation (e.g., sodium cation) to form, for example, an alkali metal percarbonate. In some aspects, the at least one inorganic perhydrate salt comprises sodium percarbonate.

In some aspects, the detergent composition comprises from about 0.001 wt % to about 5 wt % of a bleaching agent relative to the total weight of the composition. For example, the bleaching agent can be present in an amount from about 0.001 wt % to about 4 wt %, about 0.001 wt % to about 3 wt %, about 0.001 wt % to about 2 wt %, about 0.001 wt % to about 1 wt %, about 0.005 wt % to about 5 wt %, about 0.005 wt % to about 4 wt %, about 0.005 wt % to about 3 wt %, about 0.005 wt % to about 2 wt %, about 0.005 wt % to about 1 wt %, about 0.01 wt % to about 5 wt %, about 0.01 wt % to about 3 wt %, about 0.01 wt % to about 2 wt %, about 0.01 wt % to about 1 wt %, about 0.05 wt % to about 5 wt %, about 0.05 wt % to about 3 wt %, about 0.05 wt % to about 2 wt %, about 0.05 wt % to about 1 wt %, about 0.1 wt % to about 5 wt %, about 0.1 wt % to about 3 wt %, about 0.1 wt % to about 2 wt %, about 0.1 wt % to about 1 wt %, about 0.001 wt %, about 0.002 wt %, about 0.003 wt %, about 0.004 wt %, about 0.005 wt %, about 0.006 wt %, about 0.007 wt %, about 0.008 wt %, about 0.009 wt %, about 0.01 wt %, about 0.02 wt %, about 0.03 wt %, about 0.04 wt %, about 0.05 wt %, about 0.06 wt %, about 0.07 wt %, about 0.08 wt %, about 0.09 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 2 wt %, about 2.5 wt %, about 3 wt %, about 3.5 wt %, about 4 wt %, about 4.5 wt %, or about 5 wt % of the total weight of the composition.

In some aspects, the detergent composition comprises a bleach activator, which is any suitable compound that enables the release of oxygen from the bleaching agent. Examples of the bleach activator include, e.g., tetraacetylethylenediamine (TAED), sodium 3,5,5-tri-methyl hexanoyloxybenzene sulfonate (iso-NOBS), sodium nonanoyloxybenzene sulfonate (NOBS), sodium acetoxybenzene sulfonate (ABS), and pentaacetyl glucose. Bleach activators are described in U.S. Pat. No. 6,551,982, the disclosure of which is incorporated herein by reference in its entirety. In some aspects, the detergent composition comprises a bleaching agent (e.g., sodium percarbonate) and a bleach activator (e.g., tetraacetylethylenediamine (TAED)).

In some aspects, the detergent composition comprises from about 0.001 wt % to about 5 wt % of a bleach activator relative to the total weight of the composition. For example, the bleach activator can be present in an amount from about 0.001 wt % to about 4 wt %, about 0.001 wt % to about 3 wt %, about 0.001 wt % to about 2 wt %, about 0.001 wt % to about 1 wt %, about 0.005 wt % to about 5 wt %, about 0.005 wt % to about 4 wt %, about 0.005 wt % to about 3 wt %, about 0.005 wt % to about 2 wt %, about 0.005 wt % to about 1 wt %, about 0.01 wt % to about 5 wt %, about 0.01 wt % to about 3 wt %, about 0.01 wt % to about 2 wt %, about 0.01 wt % to about 1 wt %, about 0.05 wt % to about 5 wt %, about 0.05 wt % to about 3 wt %, about 0.05 wt % to about 2 wt %, about 0.05 wt % to about 1 wt %, about 0.1 wt % to about 5 wt %, about 0.1 wt % to about 3 wt %, about 0.1 wt % to about 2 wt %, about 0.1 wt % to about 1 wt %, about 0.001 wt %, about 0.002 wt %, about 0.003 wt %, about 0.004 wt %, about 0.005 wt %, about 0.006 wt %, about 0.007 wt %, about 0.008 wt %, about 0.009 wt %, about 0.01 wt %, about 0.02 wt %, about 0.03 wt %, about 0.04 wt %, about 0.05 wt %, about 0.06 wt %, about 0.07 wt %, about 0.08 wt %, about 0.09 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 2 wt %, about 2.5 wt %, about 3 wt %, about 3.5 wt %, about 4 wt %, about 4.5 wt %, or about 5 wt % of the total weight of the composition.

In some aspects, when a bleaching agent is present, a bleach catalyst can be further present in the detergent composition. The bleach catalyst can be a transition metal-containing catalyst, such as a Mn, Fe, Co, Ru, or Mo salen complexes or carbonyl complexes or Mn-, Fe-, Co-, Ru-, Mo-, Ti-, V-, and Cu-complexes with N-containing tripod ligands or Co-, Fe-Cu-, and Ru-ammine complexes.

Complexes of manganese in oxidation stage II, III, IV, or IV are particularly used and which contain one or more macrocyclic ligands with the donor functions N, NR, PR, O, and/or S. For example, a manganese-containing catalyst includes Mn(1,4,7-trimethyl-1,4,7-triazacyclononane)$(OCH_3)_3$—$(PF_6)$, $Mn(IV)_2(u\text{-}O)_3$(1,4,7-trimethyl-1,4,7-triazacyclononane)$_2$-$(PF_6)_2$, $Mn(III)_2(u\text{-}O)_1(u\text{-}OAc)_2$(1,4,7-trimethyl-1,4,7-triazacyclononane)$_2$-$(ClO_4)_2$, $Mn(IV)_4(u\text{-}O)_6$(1,4,7-triazacyclononane)$_4$-$(ClO_4)_2$, Mn(III) $Mn(IV)_4(u\text{-}O)_1(u\text{-}OAc)_2$-(1,4,7-trimethyl-1,4,7-triazacyclononane)$_2$-$(ClO_4)_3$, and mixtures thereof. Other suitable ligands include 1,5,9-trimethyl-1,5,9-triazacyclododecane, 2-methyl-1,4,7-triazacyclononane, 2-methyl-1,4,7-triazacyclononane, 1,2,4,7-tetramethyl-1,4,7-triazacyclononane, and mixtures thereof. Cobalt-containing catalysts include, for example, cobalt pentaamine chloride salts, such as $[Co(NH_3)_5Cl]Cl_2$.

In some aspects, the detergent composition comprises from about 0.001 wt % to about 5 wt % of a bleach catalyst relative to the total weight of the composition. For example, the bleach catalyst can be present in an amount from about 0.001 wt % to about 4 wt %, about 0.001 wt % to about 3 wt %, about 0.001 wt % to about 2 wt %, about 0.001 wt % to about 1 wt %, about 0.005 wt % to about 5 wt %, about 0.005 wt % to about 4 wt %, about 0.005 wt % to about 3 wt %, about 0.005 wt % to about 2 wt %, about 0.005 wt % to about 1 wt %, about 0.01 wt % to about 5 wt %, about 0.01 wt % to about 3 wt %, about 0.01 wt % to about 2 wt %, about 0.01 wt % to about 1 wt %, about 0.05 wt % to about 5 wt %, about 0.05 wt % to about 3 wt %, about 0.05 wt % to about 2 wt %, about 0.05 wt % to about 1 wt %, about 0.1 wt % to about 5 wt %, about 0.1 wt % to about 3 wt %, about 0.1 wt % to about 2 wt %, about 0.1 wt % to about 1 wt %, about 0.001 wt %, about 0.002 wt %, about 0.003 wt %, about 0.004 wt %, about 0.005 wt %, about 0.006 wt %, about 0.007 wt %, about 0.008 wt %, about 0.009 wt %, about 0.01 wt %, about 0.02 wt %, about 0.03 wt %, about 0.04 wt %, about 0.05 wt %, about 0.06 wt %, about 0.07 wt %, about 0.08 wt %, about 0.09 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 2 wt %, about 2.5 wt %, about 3 wt %, about 3.5 wt %, about 4 wt %, about 4.5 wt %, or about 5 wt % of the total weight of the composition.

In some aspects, the detergent composition comprises a chelating agent (i.e., a chelant) that serves to improve the cleaning action of the detergent by scavenging metal ions naturally found in water. Suitable examples of a chelating agent includes, e.g., citric acid, nitriloacetic acid, sodium tripolyphosphate, ethylenediaminetetraacetic acid, diethylenetriaminepentaacetic acid, tetrasodium glutamate diacetate, tetrasodium aspartate diacetate, tetrasodium iminodisuccinate, and combinations thereof. In some aspects, the detergent composition comprises tetrasodium iminodisuccinate.

In some aspects, the detergent composition comprises from about 0.001 wt % to about 5 wt % of a chelating agent relative to the total weight of the composition. For example, the chelating agent can be present in an amount from about 0.001 wt % to about 4 wt %, about 0.001 wt % to about 3 wt %, about 0.001 wt % to about 2 wt %, about 0.001 wt % to about 1 wt %, about 0.005 wt % to about 5 wt %, about 0.005 wt % to about 4 wt %, about 0.005 wt % to about 3 wt %, about 0.005 wt % to about 2 wt %, about 0.005 wt % to about 1 wt %, about 0.01 wt % to about 5 wt %, about 0.01 wt % to about 3 wt %, about 0.01 wt % to about 2 wt %, about 0.01 wt % to about 1 wt %, about 0.05 wt % to about 5 wt %, about 0.05 wt % to about 3 wt %, about 0.05 wt % to about 2 wt %, about 0.05 wt % to about 1 wt %, about 0.1 wt % to about 5 wt %, about 0.1 wt % to about 3 wt %, about 0.1 wt % to about 2 wt %, about 0.1 wt % to about 1 wt %, about 0.001 wt %, about 0.002 wt %, about 0.003 wt %, about 0.004 wt %, about 0.005 wt %, about 0.006 wt %, about 0.007 wt %, about 0.008 wt %, about 0.009 wt %, about 0.01 wt %, about 0.02 wt %, about 0.03 wt %, about 0.04 wt %, about 0.05 wt %, about 0.06 wt %, about 0.07 wt %, about 0.08 wt %, about 0.09 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 2 wt %, about 2.5 wt %, about 3 wt %, about 3.5 wt %, about 4 wt %, about 4.5 wt %, or about 5 wt % of the total weight of the composition.

In some aspects, the detergent composition comprises an optical brightener (e.g., a fluorescent whitening agent), which is any suitable hydrophilic compound that absorbs ultra violet light and emits visible (e.g., blue-violet) light to make textiles appear brighter. The optical brightener can comprise a triazole, a stilbene, or a biphenyl group. Examples of the optical brightener include, e.g., 2,2'-(2,5-thienediyl)bis[5-(2-methyl-2-propanyl)-1,3-benzoxazole, 5,5'-((perfluorocyclopent-1-ene-1,2-diyl)bis(5-methylthiophene-4,2-diyl))bis(2-(6-methoxybenzo[d]thiazol-2-yl)-1,3,4-oxadiazole), 5,5'-((perfluorocyclopent-1-ene-1,2-diyl)bis(5-methylthiophene-4,2-diyl))bis(2-(6-methoxybenzo[d]thiazol-2-yl)-1,3,4-oxadiazole), 2',7'-bis(5-(4-(tert-butyl)phenyl)-1,3,4-oxadiazol-2-yl)-$N^3$,$N^3$,$N^6$,$N^6$-tetraphenyl-9,9'-spirobi[fluorene]-3,6-diamine, N,N-diphenyl-4-(5-(4-(triphenylsilyl)phenyl)-1,3,4-oxadiazol-2-yl)aniline, ((4-((4-(5-(4-nitrophenyl)-1,3,4-oxadiazol-2-yl)phenyl)diazenyl) phenyl)azanediyl)bis(ethane-2,1-diyl) diacetate, ((4-((4-(5-(4-((E)-4-nitrostyryl)phenyl)-1,3,4-oxadiazol-2-yl)phenyl)diazenyl)phenyl)azanediyl)bis(ethane-2,1-diyl) diacetate, 4,4'-diamino-2,2'-stilbenedisulfonic acid, 4,4'-bis(benzoxazolyl)-cis-stilbene, and 2,5-bis(benzoxazol-2-yl)thiophene, and combinations thereof. In some aspects, the optical brightener can be 2,2'-(2,5-thienediyl)bis[5-(2-methyl-2-propanyl)-1,3-benzoxazole.

In some aspects, the detergent composition can comprise from about 0.001 wt % to about 5 wt % of an optical brightener relative to the total weight of the composition. For example, the optical brightener can be present in an amount from about 0.001 wt % to about 4 wt %, about 0.001 wt % to about 3 wt %, about 0.001 wt % to about 2 wt %, about 0.001 wt % to about 1 wt %, about 0.005 wt % to about 5 wt %, about 0.005 wt % to about 4 wt %, about 0.005 wt % to about 3 wt %, about 0.005 wt % to about 2 wt %, about 0.005 wt % to about 1 wt %, about 0.01 wt % to about 5 wt %, about 0.01 wt % to about 3 wt %, about 0.01 wt % to about 2 wt %, about 0.01 wt % to about 1 wt %, about 0.05 wt % to about 5 wt %, about 0.05 wt % to about 3 wt %, about 0.05 wt % to about 2 wt %, about 0.05 wt % to about 1 wt %, about 0.1 wt % to about 5 wt %, about 0.1 wt % to about 3 wt %, about 0.1 wt % to about 2 wt %, about 0.1 wt % to about 1 wt %, about 0.001 wt %, about 0.002 wt %, about 0.003 wt %, about 0.004 wt %, about 0.005 wt %, about 0.006 wt %, about 0.007 wt %, about 0.008 wt %, about 0.009 wt %, about 0.01 wt %, about 0.02 wt %, about 0.03 wt %, about 0.04 wt %, about 0.05 wt %, about 0.06 wt %, about 0.07 wt %, about 0.08 wt %, about 0.09 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 2 wt %, about 2.5 wt %, about 3 wt %, about 3.5 wt %, about 4 wt %, about 4.5 wt %, or about 5 wt % of the total weight of the composition.

In some aspects, the detergent composition can comprise a bitterant (e.g., a bittering agent), which is any suitable compound that imparts a bitter taste to the composition. The bitterant can be added to avoid accidental poisoning. Examples of the bitterant include, e.g., denatonium benzoate, sucrose octaacetate, quercetin, brucine, quassin, and combinations thereof. In an aspect, the bitterant is denatonium benzoate.

In some aspects, the detergent composition can comprise from about 0.001 wt % to about 1 wt % of a biterant relative to the total weight of the composition. For example, the optical brightener can be present in an amount from about 0.001 wt % to about 0.9 wt %, about 0.001 wt % to about 0.8 wt %, about 0.001 wt % to about 0.7 wt %, about 0.001 wt % to about 0.5 wt %, about 0.005 wt % to about 1 wt %, about 0.005 wt % to about 0.9 wt %, about 0.005 wt % to about 0.8 wt %, about 0.005 wt % to about 0.6 wt %, about 0.005 wt % to about 0.5 wt %, about 0.01 wt % to about 1 wt %, about 0.01 wt % to about 0.9 wt %, about 0.01 wt % to about 0.8 wt %, about 0.01 wt % to about 0.7 wt %, about 0.05 wt % to about 0.6 wt %, about 0.05 wt % to about 0.5 wt %, about 0.05 wt % to about 0.2 wt %, about 0.05 wt % to about 0.1 wt %, about 0.1 wt % to about 1 wt %, about 0.1 wt % to about 0.9 wt %, about 0.1 wt % to about 0.8 wt %, about 0.1 wt % to about 0.5 wt %, about 0.001 wt %, about 0.002 wt %, about 0.003 wt %, about 0.004 wt %, about 0.005 wt %, about 0.006 wt %, about 0.007 wt %, about 0.008 wt %, about 0.009 wt %, about 0.01 wt %, about 0.02 wt %, about 0.03 wt %, about 0.04 wt %, about 0.05 wt %, about 0.06 wt %, about 0.07 wt %, about 0.08 wt %, about 0.09 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, or about 1 wt % of the total weight of the composition.

In some aspects, the detergent composition comprises a corrosion inhibitor (e.g., an oxygen scavenger), which is any suitable compound that lowers the dissolved oxygen content in the washing medium by reacting with oxygen. The corrosion inhibitor can, for example, protect the inside of a washing machine from rusting. Examples of the corrosion inhibitor include, e.g., an inorganic corrosion inhibitor (e.g., a sulfite, a silicate, a polyphosphate, calcium hydroxide), an organic corrosion inhibitor (e.g., calcium hydrogen carbonate, a sulfonate, a phosphonate, a $C_{12}$-$C_{15}$ alcohol ether phosphate), or a combination thereof. In an aspect, the corrosion inhibitor can be sodium sulfite.

In some aspects, the detergent composition comprises from about 0.001 wt % to about 5 wt % of a corrosion inhibitor (e.g., an oxygen scavenger) relative to the total weight of the composition. For example, the corrosion inhibitor can be present in an amount from about 0.001 wt % to about 4 wt %, about 0.001 wt % to about 3 wt %, about 0.001 wt % to about 2 wt %, about 0.001 wt % to about 1 wt %, about 0.005 wt % to about 5 wt %, about 0.005 wt % to about 4 wt %, about 0.005 wt % to about 3 wt %, about 0.005 wt % to about 2 wt %, about 0.005 wt % to about 1 wt %, about 0.01 wt % to about 5 wt %, about 0.01 wt % to about 3 wt %, about 0.01 wt % to about 2 wt %, about 0.01 wt % to about 1 wt %, about 0.05 wt % to about 5 wt %, about 0.05 wt % to about 3 wt %, about 0.05 wt % to about 2 wt %, about 0.05 wt % to about 1 wt %, about 0.1 wt % to about 5 wt %, about 0.1 wt % to about 3 wt %, about 0.1 wt % to about 2 wt %, about 0.1 wt % to about 1 wt %, about 0.001 wt %, about 0.002 wt %, about 0.003 wt %, about 0.004 wt %, about 0.005 wt %, about 0.006 wt %, about 0.007 wt %, about 0.008 wt %, about 0.009 wt %, about 0.01 wt %, about 0.02 wt %, about 0.03 wt %, about 0.04 wt %, about 0.05 wt %, about 0.06 wt %, about 0.07 wt %, about 0.08 wt %, about 0.09 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 2 wt %, about 2.5 wt %, about 3 wt %, about 3.5 wt %, about 4 wt %, about 4.5 wt %, or about 5 wt % of the total weight of the composition.

In some aspects, the detergent composition comprises a base, a defoamer, a chelating agent, an optical brightener, a bitterant, a corrosion inhibitor, or any combination thereof as additives. In some aspects, the detergent composition comprises a combination of a base (e.g., monoethanolamine), a defoamer (e.g., coconut fatty acid), an optical brightener, a chelating agent (e.g., tetrasodium iminodisuccinate), a corrosion inhibitor (e.g., sodium sulfite), and a bitterant (e.g., denatonium benzoate) as additives.

In an aspect, the unit dose product comprises a detergent composition comprising water, at least one surfactant, and non-aqueous solvent comprising polyethylene glycol and glycerin, wherein no enzyme is present in the composition, and a percent swelling is not more than about 30% in a 24 hr test. For example, the detergent composition comprises:

about 5 to about 25 wt % water;

about 20 to about 40 wt % of at least one surfactant; and about 35 to about 55 wt % of non-aqueous solvent comprising polyethylene glycol and glycerin, wherein the detergent composition does not comprise an enzyme, and wherein a percent swelling of the unit dose product is not more than about 30% in a 24 hr test.

The amounts of each component will be selected to provide a detergent composition comprising 100 wt % of the total composition. In some aspects, a height of the pouch of the unit dose product does not decrease by more than about 15% over a temperature range of 0° F. to 125° F. and/or the detergent composition has a Zein score of less than 1.5%, or less than 1%, or less than 0.5% when tested on a 3% dilution.

In one aspect, the detergent composition consists essentially of:

about 5 to about 25 wt % water;

about 20 to about 40 wt % of at least one surfactant; and about 35 to about 55 wt % of non-aqueous solvent consisting essentially of polyethylene glycol and glycerin, wherein the detergent composition does not comprise an enzyme, and wherein a percent swelling of the unit dose product is not more than about 30% in a 24 hr test.

The amounts of each component will be selected to provide a detergent composition comprising 100 wt % of the total composition. In some aspects, a height of the pouch of the unit dose product does not decrease by more than about 15% over a temperature range of 0° F. to 125° F. and/or the detergent composition has a Zein score of less than 1.5%, or less than 1%, or less than 0.5% when tested on a 3% dilution.

In one aspect, the detergent composition consists of:

about 5 to about 25 wt % water;

about 20 to about 40 wt % of at least one surfactant; and about 35 to about 55 wt % of non-aqueous solvent consisting of polyethylene glycol and glycerin, wherein the detergent composition does not comprise an enzyme, and wherein a percent swelling of the unit dose product is not more than about 30% in a 24 hr test.

The amounts of each component will be selected to provide a detergent composition comprising 100 wt % of the total composition. In some aspects, a height of the pouch of the unit dose product does not decrease by more than about 15% over a temperature range of 0° F. to 125° F. and/or the detergent composition has a Zein score of less than 1.5%, or less than 1%, or less than 0.5% when tested on a 3% dilution.

In an example, the detergent composition comprises:

about 5 to about 20 wt % water;

about 25 to about 35 wt % of at least one surfactant (eg., a non-ionic alcohol ethoxylate (AE) and an alkyl ester sulfate (AES));

about 45 to about 55 wt % non-aqueous solvent comprising polyethylene glycol and glycerin, and at least one additive selected from a base, a defoamer, a chelating agent, an optical brightener, a bitterant, a corrosion inhibitor, and a combination thereof, wherein no enzyme is present in the composition, and wherein a percent swelling of the unit dose product is not more than about 30% in a 24 hr test.

The amounts of each component will be selected to provide a detergent composition comprising 100 wt % of the total composition. In some aspects, a height of the pouch of the unit dose product does not decrease by more than about 15% over a temperature range of 0° F. to 125° F. and/or the detergent composition has a Zein score of less than 1.5%, or less than 1%, or less than 0.5% when tested on a 3% dilution.

In an example, the detergent composition consists essentially of:

about 5 to about 20 wt % water;

about 25 to about 35 wt % of at least one surfactant (eg., a non-ionic alcohol ethoxylate (AE) and an alkyl ester sulfate (AES));

about 45 to about 55 wt % non-aqueous solvent consisting essentially of polyethylene glycol and glycerin, and at least one additive selected from a base, a defoamer, a chelating agent, an optical brightener, a bitterant, a corrosion inhibitor, and a combination thereof;

wherein no enzyme is present in the composition, and wherein a percent swelling of the unit dose product is not more than about 30% in a 24 hr test.

The amounts of each component will be selected to provide a detergent composition comprising 100 wt % of the total composition. In some aspects, a height of the pouch of the unit dose product does not decrease by more than about 15% over a temperature range of 0° F. to 125° F. and/or the detergent composition has a Zein score of less than 1.5%, or less than 1%, or less than 0.5% when tested on a 3% dilution.

In an example, the detergent composition consists of:

about 5 to about 20 wt % water;

about 25 to about 35 wt % of at least one surfactant (eg., a non-ionic alcohol ethoxylate (AE) and an alkyl ester sulfate (AES));

about 45 to about 55 wt % non-aqueous solvent consisting of polyethylene glycol and glycerin, and at least one additive selected from a base, a defoamer, a chelating agent, an optical brightener, a bitterant, a corrosion inhibitor, and a combination thereof, wherein no enzyme is present in the composition, and wherein a percent swelling of the unit dose product is not more than about 30% in a 24 hr test.

The amounts of each component will be selected to provide a detergent composition comprising 100 wt % of the total composition. In some aspects, a height of the pouch of the unit dose product does not decrease by more than about 15% over a temperature range of 0° F. to 125° F. and/or the detergent composition has a Zein score of less than 1.5%, or less than 1%, or less than 0.5% when tested on a 3% dilution.

In an example, the detergent composition comprises:

about 5 to about 25 wt % water;

about 20 to about 40 wt % of at least one surfactant; and about 40 to about 50 wt % non-aqueous solvent comprising polyethylene glycol and glycerin in a weight ratio of about 1:1 to about 2:1 and further comprises propylene glycol, ethanol, or a combination of both, and at least one additive selected from a base, a defoamer, a chelating agent, an optical brightener, a bitterant, a corrosion inhibitor, and a combination thereof;

wherein no enzyme is present in the composition, wherein a percent swelling of the unit dose product is not more than about 30% in a 24 hr test.

The amounts of each component will be selected to provide a detergent composition comprising 100 wt % of the total composition. In some aspects, a height of the pouch of the unit dose product does not decrease by more than about 15% over a temperature range of 0° F. to 125° F. and/or the detergent composition has a Zein score of less than 1.5%, or less than 1%, or less than 0.5% when tested on a 3% dilution.

In an example, the detergent composition consists essentially of:

about 5 to about 25 wt % water;

about 20 to about 40 wt % of at least one surfactant;

about 40 to about 50 wt % non-aqueous solvent consisting essentially of polyethylene glycol and glycerin in a weight ratio of about 1:1 to about 2:1 and propylene glycol, ethanol, or a combination of both, and at least one additive selected from a base, a defoamer, a chelating agent, an optical brightener, a bitterant, a corrosion inhibitor, and a combination thereof;

wherein no enzyme is present in the composition, wherein a percent swelling of the unit dose product is not more than about 30% in a 24 hr test.

The amounts of each component will be selected to provide a detergent composition comprising 100 wt % of the total composition. In some aspects, a height of the pouch of the unit dose product does not decrease by more than about 15% over a temperature range of 0° F. to 125° F. and/or the detergent composition has a Zein score of less than 1.5%, or less than 1%, or less than 0.5% when tested on a 3% dilution.

In an example, the detergent composition consists of:

about 5 to about 25 wt % water;

about 20 to about 40 wt % of at least one surfactant; and about 45 to about 55 wt % non-aqueous solvent consisting of polyethylene glycol and glycerin in a weight ratio of about 1:1 to about 2:1 and propylene glycol, ethanol, or a combination of both, and wherein no enzyme is present in the composition, wherein a percent swelling of the unit dose product is not more than about 30% in a 24 hr test.

The amounts of each component will be selected to provide a detergent composition comprising 100 wt % of the total composition. In some aspects, a height of the pouch of the unit dose product does not decrease by more than about 15% over a temperature range of 0° F. to 125° F. and/or the detergent composition has a Zein score of less than 1.5%, or less than 1%, or less than 0.5% when tested on a 3% dilution.

In an example, the detergent composition comprises:

about 5 to about 25 wt % water;

about 25 to about 35 wt % of at least one surfactant selected from an alcohol ethoxylate, an alkyl ether sulfate, coco fatty acid, and any combination thereof;

about 45 to about 55 wt % non-aqueous solvent comprising polyethylene glycol and glycerin; and at least one additive selected from a base, a defoamer, a chelating agent, an optical brightener, a bitterant, a corrosion inhibitor, and a combination thereof, wherein no enzyme is present in the composition, and wherein a percent swelling of the unit dose product is not more than about 30% in a 24 hr test.

The amounts of each component will be selected to provide a detergent composition comprising 100 wt % of the total composition. In some aspects, a height of the pouch of the unit dose product does not decrease by more than about 15% over a temperature range of 0° F. to 125° F. and/or the detergent composition has a Zein score of less than 1.5%, or less than 1%, or less than 0.5% when tested on a 3% dilution.

In an example, the detergent composition consists essentially of:

about 5 to about 25 wt % water;

about 25 to about 35 wt % of at least one surfactant selected from an alcohol ethoxylate, an alkyl ether sulfate, coco fatty acid, and any combination thereof;

about 45 to about 55 wt % non-aqueous solvent consisting essentially of polyethylene glycol, glycerin, optionally propylene glycol, and optionally ethanol; and additives selected from a base, a defoamer, a chelating agent, an optical brightener, a bitterant, and a corrosion inhibitor, wherein no enzyme is present in the composition, and wherein a percent swelling of the unit dose product is not more than about 30% in a 24 hr test.

The amounts of each component will be selected to provide a detergent composition comprising 100 wt % of the total composition. In some aspects, a height of the pouch of the unit dose product does not decrease by more than about 15% over a temperature range of 0° F. to 125° F. and/or the detergent composition has a Zein score of less than 1.5%, or less than 1%, or less than 0.5% when tested on a 3% dilution.

In an example, the detergent composition consists of:

about 5 to about 25 wt % water;

about 25 to about 35 wt % of at least one surfactant selected from an alcohol ethoxylate, an alkyl ether sulfate, coco fatty acid, and any combination thereof;

about 45 to about 55 wt % non-aqueous solvent consisting of polyethylene glycol, glycerin, optionally propylene glycol, and optionally ethanol; and additives selected from a base, a defoamer, a chelating agent, an optical brightener, a bitterant, and a corrosion inhibitor, wherein no enzyme is present in the composition, and wherein a percent swelling of the unit dose product is not more than about 30% in a 24 hr test.

The amounts of each component will be selected to provide a detergent composition comprising 100 wt % of the total composition. In some aspects, a height of the pouch of the unit dose product does not decrease by more than about 15% over a temperature range of 0° F. to 125° F. and/or the detergent composition has a Zein score of less than 1.5%, or less than 1%, or less than 0.5% when tested on a 3% dilution.

The detergent composition is enclosed (e.g., entrapped) within a water-soluble film pouch to form of a unit dose product (e.g., a detergent pack). As used herein, the term "water-soluble" means that least 2 grams of the solute (e.g., the film) dissolves in 5 liters of solvent (e.g., water) for a solubility of at least 0.4 grams per liter (g/l) at a temperature of 25° C. unless otherwise specified. Upon contact with water (e.g., water in the wash cycle in a method of washing), the water-soluble film will release the detergent composition.

The pouch can be a single compartment, and the detergent composition is releasably disposed within the single compartment. Alternatively, the pouch can have two or more (e.g., 2, 3, or 4) compartments that are sealed off from one another, and the detergent composition is releasably disposed within at least one of the two or more compartments. In some aspects, the same detergent composition is present in each compartment of the pouch. In some aspects, the other compartment(s) can include colorants or other components, such as an alternative composition in the form of solid or liquid. In some aspects, the solid composition is a powder, granule, tablet, or combinations thereof. In some aspects, the alternative composition comprises a rinse aid or a fabric softener. In some aspects, different film compositions can be used to form different sections or compartments of the pouch. For example, different films can dissolve at different rates to provide timed release of the compartments' contents.

The sealing of a water-soluble film material (e.g., in the form of one or two sheets) to form a compartment can be performed using methods known to those of skill in the art. In some aspects, the water-soluble film material is sealed using heat-scaling, solvent sealing, or ultraviolet (UV) sealing. In some aspects, the water-soluble film material sealed using water sealing.

The unit dose product (e.g., pouch or detergent pack) can be in any suitable shape and size, e.g., square, rectangular, oval, ellipsoid, superelliptical, or circular shape. In general, the size and shape of the pouch is large enough to enclose (e.g., entrap) about 15 g to about 30 g total weight of the detergent composition.

The water-soluble film is desirably strong, flexible, shock resistant, and non-tacky during storage at both high and low temperatures and high and low humidities. Non-limiting examples of suitable materials for the water-soluble film include, e.g., polyvinyl alcohol (PVOH), polyvinyl acetate (PVA), film-forming cellulosic polymers, polyacrylic acid, polyacrylamide, polyanhydride, a polysaccharide, and combinations thereof. Examples of film-forming cellulosic polymer include, e.g., cellulose, cellulose ether, cellulose ester, cellulose amide, methylcellulose, carboxymethylcellulose sodium, ethylcellulose, hydroxyethyl cellulose, hydroxypropyl methyl cellulose (HPMC), and combinations thereof. Unit dose detergent packs, including water-soluble films, are described in U.S. Pat. Nos. 8,551,929, 10,774,294, and 11,492,574, the disclosures of which are incorporated herein by reference in their entirety. In some aspects, the water-soluble film material comprises polyvinyl alcohol (PVOH) or polyvinyl acetate (PVA).

In an aspect, the water-soluble film material is polyvinyl alcohol (PVOH). In some aspects, the PVOH can have a number average molecular weight range of about 10,000 to about 100,000 g/mol (e.g., about 10,000 to about 80,000 g/mol, about 15,000 to about 60,000 g/mol, about 20,000 to about 50,000 g/mol, about 25,000 to about 40,000 g/mol, or about 27,000 to about 33,000).

In some aspects, the film material comprises a bitterant (e.g., denatonium benzoate) as described herein, to impart a bitter taste to help avoid accidental poisoning.

In some aspects, the film material can have a thickness of about 10 to about 100 μm (e.g., about 10 to 90 μm, about 20 to about 80 μm, about 50 to about 100 μm, about 50 to about 80 μm, about 70 to about 80 μm, about 100 μm, about 95 μm, about 90 μm, about 85 μm, about 80 μm, about 75 μm, about 70 μm, about 65 μm, about 60 μm, about 55 μm, about 50 μm, about 45 μm, about 40 μm, about 35 μm, about 30 μm, about 25 μm, about 20 μm, about 15 μm, or about 10 μm). In some aspects, the film material will have a thickness of about 75 μm.

In some aspects, the present disclosure is directed to a method of using the unit dose product of any of the foregoing aspects. For example, the unit dose product can be used in a method of removing soil from a textile (e.g., cleaning a textile, such as a fabric). In particular, the present disclosure is directed to a method of removing soil from a textile comprising contacting the textile with a composition comprising the unit dose product described herein and water to form a washing load. Optional steps include mixing (agitating) the washing load and composition, removing the composition to provide a clean textile, rinsing the clean textile with additional water, and isolating the clean textile. In some aspects, soils that are suitably removed using the unit dose product include, but are not limited to, oil-containing soils, carbohydrate-containing soils, protein-containing soils, tannin-containing soils, particulate soils, and combinations thereof.

In some aspects of these methods, the method can be performed using a washing machine, a tergotometer, or an equivalent device. In some aspects of these methods, the water is hot or warm water. In some aspects of these methods, the water is cold water.

In an aspect, the method is directed to providing a mild detergent composition.

In an aspect, the method is directed to providing an allergen-free detergent composition.

In an aspect, the method is directed to providing detergent compositions comprising Safer Choice ingredients.

EXAMPLES

These examples are provided for the purpose of illustration only and the embodiments described herein should in no way be construed as being limited to these examples. Rather, the embodiments should be construed to encompass any and all variations which become evident as a result of the teaching provided herein.

Example 1

A detergent formulations for unit dose packages, Formula 1, was formed to create a base formula for creating different formulations with varying ratios of non-aqueous solvents. The final pH of the formulations were targeted to be pH 7.7 and formulations were made in a standard overhead mixer as listed in Table 1. Different ratios of glycerin, propylene glycol (PG), and polyethylene glycol (PEG) were added to Formula 1 at 49.143 total wt % to create additional formulations as listed in Table 2.

TABLE 1

| COMPONENT | Activity % | Formula 1 (wt %) |
|---|---|---|
| Non-Aqueous Solvent Glycerin | 99+ | 0 |
| Non-Aqueous Solvent Propylene Glycol (PG) | 99+ | 0 |
| Non-Aqueous Solvent Polyethylene Glycol (PEG 400) | 99+ | 0 |
| Non-Aqueous Solvent SDA-3C Ethanol (200 Proof) | 100 | 3 |
| Non-ionic surfactant Fatty alcohol ethoxylate (AE) (25-7) | 99+ | 23.07* |
| Monoethanolamine | 99+ | 1.4 |
| Water | 100 | 10.5 |
| Non-ionic surfactant Linear Alkylbenzene Sulfonate | 96 | 0 |
| Anionic surfactant Alkyl Ether Sulfate, 3EO, 70% paste | 70 | 4.8* |
| Coconut Fatty Acid, optical brightener, iminodisuccinic acid, sodium sulfite (15% solution), bittering agent | 100 | 8.08 |
| Initial Formula 1 Total | | 50.86 |
| % Reserved for Design Formulations | | 49.14 |
| Total | | 100.0 |

*Varying wt % of surfactants including MEE, AES, or AE, or combinations thereof, among others, may be included.

TABLE 2

| Formula | Ratio PEG 400 | PG | Glycerin |
|---|---|---|---|
| 2 | 1 | 0 | 0 |
| 3 | 0 | 1 | 0 |
| 4 | 0 | 0 | 1 |
| 5 | 0.5 | 0.5 | 0 |
| 6 | 0 | 0.5 | 0.5 |
| 7 | 0.5 | 0 | 0.5 |
| 8 | 0.33 | 0.33 | 0.33 |
| 9 | 0.17 | 0.17 | 0.67 |
| 10 | 0.17 | 0.67 | 0.17 |
| 11 | 0.67 | 0.17 | 0.17 |

To measure the percent (%) swelling, a fresh sheet of film was traced and cut into three identical film strips (3 cm wide by 8.5 cm long) for each formula being tested. Strips were labeled #1, #2, and #3 and placed into a tared petri dish one by one, recording the weights of each piece of film individually. Strips #1 and #2 were placed parallel to one another on the bottom of the petri dish and strip #3 was laid perpendicularly over strips #1 and #2. The petri dish was then filled half way, ensuring all film strips were submerged in the formula being tested. The petri dish was wrapped with parafilm, sealing around the edge of the petri dish. The petri dish was placed in a chamber calibrated at 21.1° C. (70° F.) over night. The petri dish was then removed from the chamber, and the parafilm seal was removed.

With a pair of tweezers, strip #3 was removed, allowed to drip for a few seconds, and excess liquid was removed using a series of three delicate wipes designed for chemical use. Strip #3 was placed on the center of a first delicate wipe, which was placed in the center of a heavy duty wipe designed for chemical use. The top and bottom of the delicate wipe were folded over the strip, followed by the left and right sides of the delicate wipe. The delicate wipe was then pressed into the heavy duty wipe, as there was a large amount of excess liquid. The second and third delicate wipes were wrapped using the same procedure but were gently "kneaded" between the thumb and index finders of both hands for approximately 5 seconds. The third (outside) delicate wipe was nearly dry. The delicate wipes were unfolded, and the film strip was removed using tweezers. Consistency in this technique is key to obtaining accurate swelling ratio data.

The cleaned film strip #3 was placed into a clean, tared petri dish lid, and the final weight of the film strip was recorded. The cleaning steps were repeated for strips #1 and #2.

Percent (%) swelling ratios were determined for Formulas 2-11 using polyvinyl alcohol (PVA) strips. The tests were run in triplicate, and the results were averaged. The percent swelling results, as shown in Table 3, were calculated using the formula: (post-weight−pre-weight)/pre-weight. A lower percent swelling indicates less damage or impact on the polyvinyl alcohol pouch film material and therefore a more stable unit dose product.

TABLE 3

| Formula | Pre-weight (grams) | | | Pre-Weight Average (grams) | Post-weight (grams) | | | Post-Weight Average (grams) | % Swelling |
|---|---|---|---|---|---|---|---|---|---|
| 2 | 0.23 | 0.24 | 0.24 | 0.23 | 0.25 | 0.25 | 0.24 | 0.25 | 7.28% |
| 3 | 0.22 | 0.23 | 0.23 | 0.23 | 0.32 | 0.32 | 0.33 | 0.32 | 43.18% |
| 4 | 0.23 | 0.23 | 0.22 | 0.23 | 0.42 | 0.42 | 0.40 | 0.41 | 79.38% |
| 5 | 0.23 | 0.24 | 0.24 | 0.23 | 0.28 | 0.28 | 0.27 | 0.27 | 17.38% |
| 6 | 0.23 | 0.23 | 0.23 | 0.23 | 0.37 | 0.38 | 0.37 | 0.37 | 65.26% |
| 7 | 0.24 | 0.23 | 0.22 | 0.23 | 0.28 | 0.28 | 0.30 | 0.29 | 25.72% |
| 8 | 0.23 | 0.22 | 0.25 | 0.23 | 0.33 | 0.32 | 0.32 | 0.32 | 34.68% |
| 9 | 0.23 | 0.23 | 0.24 | 0.23 | 0.40 | 0.35 | 0.37 | 0.37 | 58.53% |

TABLE 3-continued

| Formula | Pre-weight (grams) | | | Pre-Weight Average (grams) | Post-weight (grams) | | | Post-Weight Average (grams) | % Swelling |
|---|---|---|---|---|---|---|---|---|---|
| 10 | 0.24 | 0.23 | 0.23 | 0.23 | 0.31 | 0.31 | 0.33 | 0.32 | 38.11% |
| 11 | 0.24 | 0.23 | 0.23 | 0.24 | 0.26 | 0.27 | 0.26 | 0.26 | 12.58% |

Using Minitab data analysis software (Minitab, LLC, State College, PA) analysis of variance for percent swelling based on the component proportions and estimated regression coefficients were produced as presented in Tables 4 and 5, respectively. The model summary for analysis of variance indicated an S value of 0.05, R-squared value of 95.97%, R-squared adjusted value of 95.22%, predicted residual error sum of squares (PRESS) value of 0.09, and R-squared predicted value of 94.46%. Overall, the model was significant, with a p value of less than 0.05, and a high R-squared prediction value, which indicates the model can explain that percentage of difference from an actual data point versus the data point predicted from the Estimated Regression Coeffecient Equation, i.e. difference of actual vs. predicted.

The estimated regression coefficient for percent swelling showed that the polyethylene glycol impacts the polyvinyl alcohol pouch film the least, 0.07 versus 0.43 for polypropylene glycol (PG), and 0.80 for glycerin. Polyethylene glycol impact on swelling was about 6.42 times smaller than the propylene glycol, and about 12.12 times smaller than the glycerin, indicating less destabilization of the polyvinyl alcohol film and therefore a detergent composition with less impact on the polyvinyl alcohol film and a more stable unit dose package product. While a formulation comprising higher levels of PEG produced a pack with lower swelling percent than other formulations, formulations with PEG and glycerin also produced a pack with low swelling percent.

TABLE 4

| Source | Degrees of Freedom (DF) | Sequential Sum of Squares (SS) | Adjusted SS | Adjusted Mean of Squares (MS) | F-Value | P-Value |
|---|---|---|---|---|---|---|
| Regression | 5 | 1.55 | 1.55 | 0.31 | 128.59 | 0.00 |
| Linear | 2 | 1.46 | 0.90 | 0.45 | 186.87 | 0.00 |
| Quadratic | 3 | 0.09 | 0.09 | 0.030 | 12.72 | 0.00 |
| PEG*PG | 1 | 0.02 | 0.02 | 0.02 | 6.54 | 0.02 |
| PEG*Glycerin | 1 | 0.07 | 0.07 | 0.07 | 29.83 | 0.00 |
| PG*Glycerin | 1 | 0.01 | 0.01 | 0.01 | 2.37 | 0.14 |
| Residual Error | 27 | 0.07 | 0.07 | 0.00 | | |
| Lack-of-Fit | 5 | 0.01 | 0.01 | 0.00 | 0.42 | 0.83 |
| Pure Error | 22 | 0.06 | 0.06 | 0.00 | | |
| Total | 32 | 1.61 | | | | |

TABLE 5

| | Coefficient of variation (CV) | Standard error of the coefficient | T-value | P-value | Variance inflation factor (VIF) |
|---|---|---|---|---|---|
| PEG | 0.07 | 0.03 | — | — | 1.99 |
| PG | 0.43 | 0.03 | — | — | 2.03 |
| Glycerin | 0.08 | 0.03 | — | — | 2.21 |
| PEG*PG | −0.32 | 0.13 | −2.56 | 0.02 | 2.04 |
| PEG*Glycerin | −0.68 | 0.13 | −5.46 | 0.00 | 2.14 |
| PG*Glycerin | 0.19 | 0.12 | 1.54 | 0.14 | 2.22 |

Example 2

To further elucidate the effectiveness and properties of a unit dose package comprising higher solvent ratios, varying formulations of detergent compositions were created with targeted pH of 7.7 in a standard overhead mixer as listed in Table 6.

TABLE 6

| COMPONENT | Activity % | Formula 12 (inventive) (wt %) | Formula 13 (comparative) (wt %) |
|---|---|---|---|
| Non-Aqueous Solvent Glycerin | 99+ | 19.23 | 14.73 |
| Non-Aqueous Solvent Propylene Glycol (PG) | 99+ | 0 | 8.21 |
| Non-Aqueous Solvent Polyethylene Glycol (PEG 400) | 99+ | 28.85 | 5.8 |
| Non-Aqueous Solvent SDA-3C Ethanol (200 Proof) | 100 | 3 | 3 |
| Non-ionic surfactant Fatty alcohol ethoxylate (AE) (25-7) | 99+ | 24.13 | 23.07 |
| Monoethanolamine | 99+ | 1.4 | 4.8 |
| Water | 100 | 10.5 | 10.5 |
| Non-ionic surfactant Linear Alkylbenzene Sulfonate | 96 | 0 | 17 |
| Anionic surfactant Alkyl Ether Sulfate, 3EO, 70% paste | 70 | 4.8 | 4.8 |
| Coconut Fatty Acid, optical brightener, iminodisuccinic acid, sodium sulfite (15% solution), bittering agent | 100 | 8.08 | 8.08 |

To compare the effect of concentration of the non-aqueous solvent on the unit dose pack pouch film, unit dose packs with PVA pouch films with 18.8 grams of detergent Formulas 12 and 13 disposed therein were prepared. Duplicate packs were measured for pack height and then stored at either 0° F. (−17.78° C.), 40° F. (4.44° C.), 75° F. (23.89° C.), 105° F. (40.56° C.), or 125° F. (51.67° C.) for one week. Pack heights after storage at these temperatures were measured and compared to the pre-storage height. Each height was measured in triplicate using an Ames Logic Basic Digital Comparator Model BG1110 Jan. 4, on a column mounted indicator, model 99-0697. Height of the sample was measured by placing pack under digital indicator, after the scale was zeroed. More stable packs have a higher pack height (i.e., less of a decrease in pack height after the test). Table 7 shows the pack height values and demonstrates that Formula 12 provides a stable unit dose pack across all temperatures. Starting height (0 weeks) for the packs was 0.95 inches.

TABLE 7

| | Storage Temperature | Week 1 measurement (inches) | Average (inches) |
|---|---|---|---|
| Formula 13 (Comparative) | 0° F. (−17.78° C.) | 0.96 | 0.95 |
| | | 0.97 | |
| | | 0.96 | |
| | | 0.92 | |
| | | 0.92 | |
| | | 0.94 | |
| | 40° F. (4.44° C.) | 0.90 | 0.93 |
| | | 0.92 | |
| | | 0.94 | |
| | | 0.93 | |
| | | 0.95 | |
| | | 0.96 | |
| | 75° F. (23.89° C.) | 0.94 | 0.95 |
| | | 0.95 | |
| | | 0.96 | |
| | | 0.94 | |
| | | 0.96 | |
| | | 0.93 | |
| | 105° F. (40.56° C.) | 0.93 | 0.94 |
| | | 0.94 | |
| | | 0.95 | |
| | | 0.93 | |
| | | 0.96 | |
| | | 0.92 | |
| | 125° F. (51.67° C.) | 0.874 | 0.87 |
| | | 0.88 | |
| | | 0.90 | |
| | | 0.85 | |
| | | 0.86 | |
| | | 0.86 | |
| | | 0.670 | |
| | | 0.69 | |
| | | 0.72 | |
| | | 0.79 | |
| | | 0.77 | |
| Formula 12 (inventive) | 0° F. (−17.78° C.) | 0.85 | 0.86 |
| | | 0.85 | |
| | | 0.89 | |
| | | 0.85 | |
| | | 0.85 | |
| | | 0.87 | |
| | 40° F. (4.44° C.) | 0.91 | 0.90 |
| | | 0.93 | |
| | | 0.93 | |
| | | 0.87 | |
| | | 0.89 | |
| | | 0.88 | |
| | 75° F. (23.89° C.) | 0.88 | 0.88 |
| | | 0.88 | |
| | | 0.88 | |
| | | 0.87 | |
| | | 0.88 | |
| | | 0.89 | |

TABLE 7-continued

| Storage Temperature | Week 1 measurement (inches) | Average (inches) |
|---|---|---|
| 105° F. (40.56° C.) | 0.87 | 0.89 |
| | 0.87 | |
| | 0.89 | |
| | 0.89 | |
| | 0.89 | |
| | 0.91 | |
| 125° F. (51.67° C.) | 0.83 | 0.82 |
| | 0.82 | |
| | 0.85 | |
| | 0.80 | |
| | 0.84 | |
| | 0.79 | |

To test for mildness, Formulas 12 and 13 were assessed using the Zein test, as described in Gott, E., Aesthet. Medzin., Tenside 15:313 (1966) and US 2018/0016523 A1, the disclosures of which are incorporated herein by reference in their entirety. The Zein test is a good indicator of mildness. For the Zein test, detergent formulas were diluted 3% with filtered water and Zein protein was added to the solution. The Zein-detergent mixture was stirred for one hour at room temperature. Undissolved Zein protein was then removed by filtration. Weight of undissolved solids was measured in a 3 mL aliquot of the filtered solution following drying in an oven at 70° C. The weight of solids in a 3 mL aliquot of the detergent formula was determined after drying at 70° C. The weight of solids in the detergent formula was then subtracted from the weight of solids in the filtered Zein-detergent mixture and to determine the quantity of dissolved Zein protein. This is then reported as grams dissolved Zein per 100 g formulation, also called the % Zein or "Zein score." The greater the dissolved protein, or higher the % Zein, or Zein score, indicates a more irritating detergent formula. Formula 13 comprising LAS had a Zein score of 2.27% and Formula 12 comprising no LAS and increased PEG had a Zein score of 0.33% and 0.05% in replicate tests. After performing a Tukey Analysis, the scores were found to be significantly different from one another, with Formula 12 being at least 6.88 times milder than comparative Formula 13.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A unit dose product comprising:

a pouch formed from a water-soluble film material;

a detergent composition comprising (a) about 5 to about 25 weight percent (wt %) water, (b) about 20 to about 40 wt % of at least one surfactant, and (c) about 35 to about 55 wt % of non-aqueous solvent consisting essentially of one or two non-aqueous solvents and polyethylene glycol;

wherein no enzyme is present in the composition;

wherein a percent swelling is not more than about 30% in a 24 hr test; and wherein the detergent composition is disposed within the pouch.

2. The unit dose product of claim 1, wherein a height of the pouch does not decrease by more than about 15% over a temperature range of 0° F. to 125° F.

3. The unit dose product of claim 1, wherein the detergent composition has a Zein score of not more than 1.5% dissolved zein when tested on a 3% dilution.

4. The unit dose product of claim 3, wherein the detergent composition has a Zein score of not more than 1% dissolved zein when tested on a 3% dilution.

5. The unit dose product of claim 4, wherein the detergent composition has a Zein score of not more than 0.5% dissolved zein when tested on a 3% dilution.

6. The unit dose product of claim 1, wherein the detergent composition comprises about 40 to about 50 wt % of non-aqueous solvent.

7. The unit dose product of claim 1, wherein the non-aqueous solvent comprises polyethylene glycol and glycerin in a weight ratio of about 1:1 to about 2:1.

8. The unit dose product of claim 1, wherein the one or two non-aqueous solvents are selected from the group consisting of ethanol, n-propanol, isopropanol, ethylene glycol, diethylene glycol, triethylene glycol, diethylene glycol monobutyl ether, propylene glycol, dipropylene glycol, tripropylene glycol, dipropylene glycol monobutyl ether, 1,3-butylene glycol, 1,4-butylene glycol, 1-(1-butoxy-2-propoxy)-2-propanol, 2-methyl-2,4-pentanediol, 1,5-pentanediol, and 1,6-hexanediol.

9. The unit dose product of claim 7, wherein the non-aqueous solvent further comprises ethanol.

10. The unit dose product of claim 1, wherein the surfactant to non-aqueous solvent weight ratio ranges from about 1:1 to about 1:1.5.

11. The unit dose product of claim 1, wherein the detergent composition comprises about 25 to about 35 wt % of at least one surfactant.

12. The unit dose product of claim 1, wherein the at least one surfactant comprises a non-ionic alcohol ethoxylate (AE), an alkyl ether sulfate (AES), or a combination of both.

13. The unit dose product of claim 12, wherein the non-ionic alcohol ethoxylate (AE) comprises the formula $R^1$-$(EO)_n$—OH, wherein $R^1$ is a $C_{12}$-$C_{18}$ alkyl group, EO is ethoxylate, and n is an integer of moles from 1 to 15.

14. The unit dose product of claim 12, wherein the at least one surfactant comprises AE and AES with an AE to AES weight ratio of at least about 3:1.

15. The unit dose product of claim 13, wherein the AE to AES weight ratio is between about 4:1 and about 6:1.

16. The unit dose product of claim 1, wherein the at least one surfactant does not include a linear alkyl benzene sulfonate.

17. The unit dose product of claim 1, wherein the detergent composition has a pH of about 6.5 to about 12.

18. The unit dose product of claim 1, wherein the detergent composition further comprises at least one additive selected from a base, a performance polymer, an anti-redeposition agent, a defoamer, a bleaching agent, a bleach activator, a chelating agent, an optical brightener, a bitterant, a corrosion inhibitor, and any combination thereof.

19. The unit dose product of claim 18, wherein the performance polymer comprises at least one of polyethyleneimine ethoxylate and polyethyleneimine ethoxylate propoxylate.

20. The unit dose product of claim 1, wherein the detergent composition comprises about 45 to about 55 wt % of non-aqueous solvent comprising polyethylene glycol and glycerin;

a total of about 25 to about 35 wt % surfactants comprising at least one surfactant selected from an alcohol ethoxylate, an alkyl ether sulfate, coco fatty acid, and any combination thereof; and at least one additive selected from a base, a defoamer, a chelating agent, an optical brightener, a bitterant, a corrosion inhibitor, and a combination thereof.

21. The unit dose product of claim 1, wherein the water-soluble film material comprises polyvinyl alcohol (PVOH) or polyvinyl acetate (PVA).

* * * * *